(12) United States Patent
Shin et al.

(10) Patent No.: US 12,222,895 B2
(45) Date of Patent: Feb. 11, 2025

(54) METHOD AND ELECTRONIC DEVICE FOR SYNCHRONIZING HANDWRITING

(71) Applicant: SAMSUNG ELECTRONICS CO., LTD., Suwon-si (KR)

(72) Inventors: Jinsu Shin, Suwon-si (KR); Taewon Kwak, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/199,902

(22) Filed: May 19, 2023

(65) Prior Publication Data

US 2023/0315679 A1 Oct. 5, 2023

Related U.S. Application Data

(63) Continuation of application No. PCT/KR2023/001786, filed on Feb. 8, 2023.

(30) Foreign Application Priority Data

Apr. 5, 2022 (KR) .................. 10-2022-0042412

(51) Int. Cl.
*G06F 16/11* (2019.01)
*G06F 16/14* (2019.01)
*G06F 16/178* (2019.01)

(52) U.S. Cl.
CPC .......... *G06F 16/122* (2019.01); *G06F 16/144* (2019.01); *G06F 16/178* (2019.01)

(58) Field of Classification Search
CPC ..... G06F 16/122; G06F 16/144; G06F 16/178
See application file for complete search history.

(56) References Cited

U.S. PATENT DOCUMENTS

| | | | |
|---|---|---|---|
| 7,793,233 B1 * | 9/2010 | Sellers | G06F 3/0481 715/780 |
| 8,917,276 B2 | 12/2014 | Cornell | |
| 9,710,701 B2 * | 7/2017 | Zaitsev | G06F 16/00 |
| 10,877,642 B2 | 12/2020 | Bae et al. | |

(Continued)

FOREIGN PATENT DOCUMENTS

| EP | 3039512 A1 | 7/2016 |
|---|---|---|
| JP | H10134003 A | 5/1998 |

(Continued)

OTHER PUBLICATIONS

International Search Report and Written Opinion for International Application No. PCT/KR2023/001786; International Filing Date Feb. 8, 2023; Date of Mailing May 16, 2023; 6 Pages.

*Primary Examiner* — Ken Hoang
(74) *Attorney, Agent, or Firm* — CANTOR COLBURN LLP

(57) ABSTRACT

One or more embodiments disclose a method and an apparatus including a memory, and a processor operatively connected to the memory. The processor is configured to, as handwriting is input by a user, analyze strokes of the input handwriting, generate search data and action link data, based on the analyzed strokes, generate search-based recognition data including the search data and link flag information associated with the action link data, and store a handwriting file including the generated search-based recognition data. Various embodiments are possible.

16 Claims, 17 Drawing Sheets

(56) References Cited

U.S. PATENT DOCUMENTS

| | | |
|---|---|---|
| 11,042,855 B2 | 6/2021 | Kim et al. |
| 2008/0174568 A1 | 7/2008 | Kim |
| 2014/0072225 A1* | 3/2014 | Ogawa .................. G06V 30/32 |
| | | 382/186 |
| 2014/0089841 A1 | 3/2014 | Kim et al. |
| 2014/0337720 A1 | 11/2014 | Park et al. |
| 2014/0363083 A1 | 12/2014 | Xia et al. |
| 2021/0012101 A1 | 1/2021 | Khomenko et al. |
| 2021/0350122 A1* | 11/2021 | Dixon .................... G06V 30/36 |

FOREIGN PATENT DOCUMENTS

| | | | |
|---|---|---|---|
| KR | 20020030843 A | 4/2002 | |
| KR | 20130087871 A | 8/2013 | |
| KR | 101335771 B1 | 12/2013 | |
| KR | 20140039517 A | 4/2014 | |
| KR | 20160003112 A | 1/2016 | |
| KR | 101669821 B1 | 10/2016 | |
| KR | 20180055572 A | 5/2018 | |
| KR | 102026947 B1 | 9/2019 | |
| KR | 102221223 B1 | 3/2021 | |
| KR | 20210110471 A | 9/2021 | |
| KR | 2022-0004924 A * | 12/2022 | ........... G06F 3/0354 |

\* cited by examiner

1531 ~ ⊛ AI CORE TECHNOLOGY

1533 ~ ⊖ BIG DATA

METHOD AND ELECTRONIC DEVICE FOR SYNCHRONIZING HANDWRITING

CROSS-REFERENCE TO RELATED APPLICATION(S

This application is a continuation application, claiming priority under § 365(c), of International Application No. PCT/KR2023/001786, filed on Feb. 8, 2023, which is based on and claims the benefit of Korean patent application number 10-2022-0042412 filed on Apr. 5, 2022, in the Korean Intellectual Property Office, the disclosures of which are incorporated by reference herein in their entireties.

TECHNICAL FIELD

One or more embodiments of the disclosure relate to a method and an electronic device for synchronizing handwriting.

BACKGROUND ART

With the development of digital technologies, various types of electronic devices such as mobile communication terminals, personal digital assistants (PDAs), electronic organizers, smartphones, tablet personal computers (PCs), and wearable devices have become widely used. The hardware components and/or software components of the electronic device are continually improving in order to improve support and increase functions thereof.

For example, the electronic device provides a function of allowing a user to take a memo without any notebook or pen anytime, anywhere. For example, the user may directly take a note on a display (for example, a touch screen) by using a user's finger or an electronic pen. The electronic device may receive an input of a touch trajectory (or coordinate) of a touch (or contact) on the display as handwriting (or note). The user may input handwriting with an electronic pen as if taking a note with a pen, so as to conveniently take a note while feeling analog sensitivity.

DISCLOSURE

Technical Problem

In order to recognize handwriting input by a user, an electronic device should be able to pre-record a recognition result of search (or text) data or action link data. The action link data may be to provide an icon associated with a function so that the function (for example, a phone call or an email address) corresponding to handwriting can be executed. Since it takes recognition time to provide action link data to handwriting, it is required to construct in advance a database for the action link data.

Technical Solution

One or more embodiments disclose a method and an apparatus for, when handwriting (or a note) is input, analyzing the handwriting to generate each of search data and action link data, inserting search-based recognition data including the search data and link flag information associated with the action link data into a handwriting file, and storing the handwriting file.

An electronic device according to one or more embodiments of the disclosure includes a memory, and a processor operatively connected to the memory, wherein the processor is configured to, as handwriting is input by a user, analyze strokes of the input handwriting, generate search data and action link data, based on the analyzed strokes, generate search-based recognition data including the search data and link flag information associated with the action link data, and store a handwriting file including the generated search-based recognition data.

A method of operating an electronic device according to one or more embodiments of the disclosure includes, as handwriting is input by a user, analyzing strokes of the input handwriting, generating search data and action link data, based on the analyzed strokes, generating search-based recognition data including the search data and link flag information associated with the action link data, and storing a handwriting file including the generated search-based recognition data.

Advantageous Effects

According to one or more embodiments, an electronic device can analyze input handwriting to generate each of search data and action link data, insert search-based recognition data including the search data and link flag information associated with the action link data into a handwriting file, and store the handwriting file, thereby reducing time spent for recognizing the action link data.

According to one or more embodiments, the electronic device can store search data for input handwriting, store the same in a search database (DB), distinguish action link data for each link type, and store the action link data in an action link DB, thereby efficiently using the search DB and the action link DB for recognizing search data and action link data in the future.

According to one or more embodiments, the electronic device can insert search-based recognition data including search data and flag information associated with action link data into a handwriting file and store the handwriting file in a file DB, thereby easily identifying search data and generating action link data from the search-based recognition data included in the handwriting file in an electronic device of another user when the handwriting file is shared with another user.

According to one or more embodiments, the electronic device can identify search data and generate action link data on the basis of search-based recognition data included in a handwriting file, thereby reducing a time spent for recognizing the action link data and easily using the action link data.

According to one or more embodiments, the electronic device can improve a speed at which action link data is generated and recognized on the basis of an index offset of link flag information included in search-based recognition data.

According to one or more embodiments, the electronic device separately constructs a search DB, an action link DB, and a file DB, and thus does not need to store DBs of all recognition technologies, thereby reducing the database size.

DESCRIPTION OF DRAWINGS

FIGS. 15A and 15B illustrate another example in which the electronic device uses search-based recognition data according to various embodiments.

MODE FOR INVENTION

Figure 1:
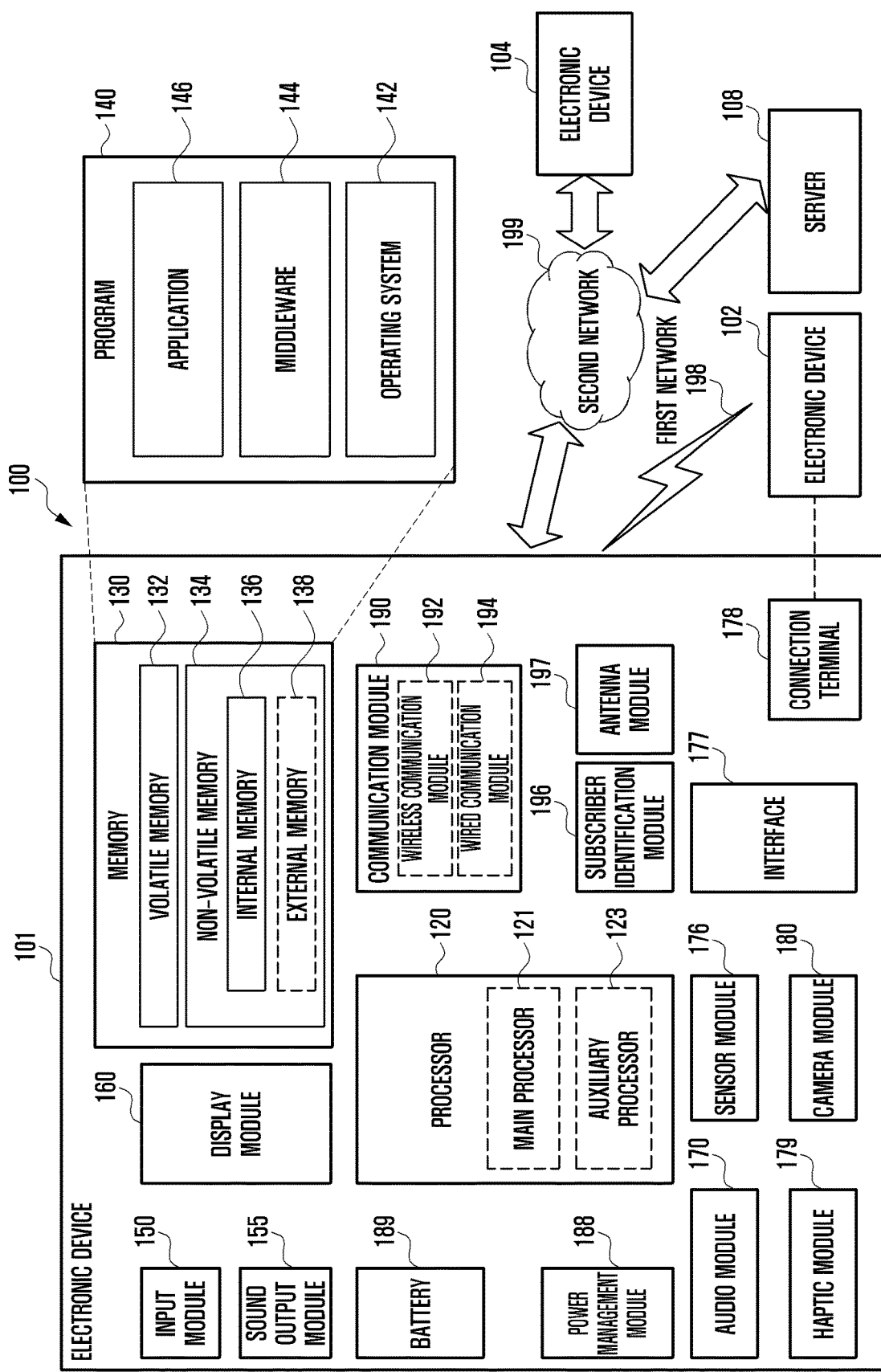
FIG. 1 is a block diagram illustrating an electronic device within a network environment according to various embodiments.

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added. Electronic device (for example, the electronic device 101 of FIG. 1) according to one or more embodiments of the disclosure may include a memory (for example, the memory 130 of FIG. 1), and a processor (for example, the processor 120 of FIG. 1) operatively connected to the memory, wherein the processor may be configured to, as handwriting is input by a user, analyze strokes of the input handwriting, generate search data and action link data, based on the analyzed strokes, generate search-based recognition data including the search data and link flag information associated with the action link data, and store a handwriting file including the generated search-based recognition data.

The processor may be configured to determine lines of the handwriting, based on the analyzed strokes and generate the search data or the action link data for each of the determined lines. The link flag information may include at least one of an action link type, stroke information, or an index offset.

The processor may be configured to configure the action link type when an action link function corresponding to the input handwriting is provided, and not to configure the action link type when an action link function corresponding to the input handwriting is not provided.

The processor may be operable to configure the action link type as at least one of a phone number, an Internet address, an email address, and/or an equation.

The stroke information may include at least one of a total number of strokes, a first stroke ID, and/or a last stroke ID for one line.

The index offset may include an offset value for an index for which next action link data exists, and the processor may be configured to configure an index offset of previous link flag information after determining an action link type of the next action link data.

The processor may be configured to determine an action link type and stroke information of the link flag information, based on the analyzed strokes, determine whether a next line exists in the handwriting, when there is the next line in the handwriting, analyze strokes of the next line, determine whether an action link exists in the next line, based on the analyzed strokes, and configure an index offset of the link flag information when the action link exists in the next line and not configure the index offset of the link flag information when the action link does not exist in the next line.

The processor may be configured to acquire a second handwriting file different from the handwriting file, extract second search-based recognition data included in the second handwriting file, and identify and store second search data or generate and store second action link data, based on the second search-based recognition data.

The processor may be configured to perform an operation of generating and storing second action link data after completing the identification and storage of the second search data for each line.

The processor may be configured to determine whether an action link type of link flag information for one link is configured, based on the second search-based recognition data, when the action link type is configured, collect stroke information, based on a stroke area of second search data, circularly check strokes, based on the collected stroke information and identify stroke identifications (IDs), determine whether the stroke IDs correspond to stroke order information included in the second search-based recognition data, and repeatedly perform an operation of identifying the strokes and an operation of determining whether the stroke IDs correspond to the stroke order information until the stroke IDs correspond to the stroke order information.

The processor may be configured to, when the stroke IDs correspond to the stroke order information, generate second action link data, determine whether an index offset of second link flag information included in the second search-based recognition data is configured, when the index offset of the second link flag information is configured, move by a value configured in the index offset and collect stroke information, and when the index offset of the second link flag information is not configured, end an action link data generation operation.

Figure 2:
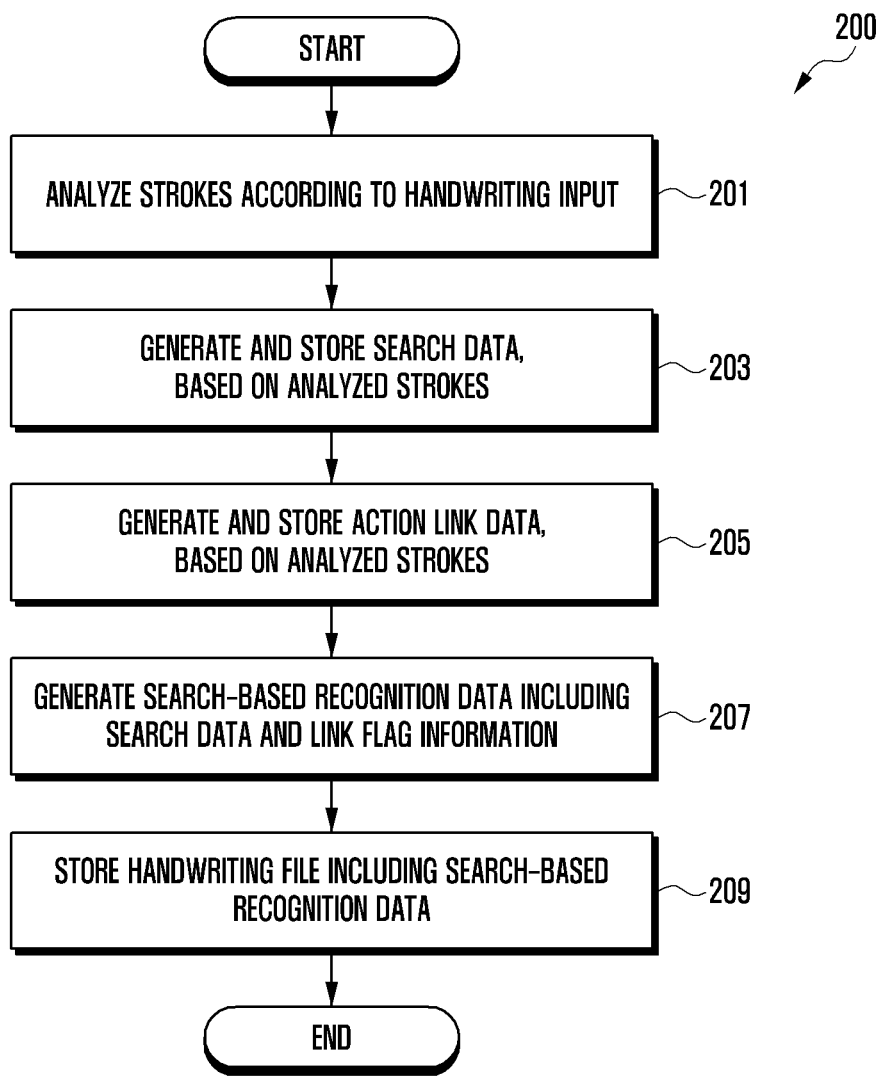
FIG. 2 is a flowchart illustrating a method of operating the electronic device according to various embodiments.

FIG. 2 is a flowchart 200 illustrating a method of operating an electronic device according to various embodiments.

Referring to FIG. 2, in operation 201, a processor (for example, the processor 120 of FIG. 1) of an electronic device (for example, the electronic device 101 of FIG. 1) according to one or more embodiments may analyze strokes according to a note-taking (or handwriting) input. The user may input handwriting by touching a display (for example, the display module 160 of FIG. 1) of the electronic device 101 by using a user's body (for example, a finger) or an electronic pen. For example, the processor 120 may execute an application (for example, a memo application) for inputting handwriting and receive an input of a touch trajectory (or coordinate) input into an input area of the executed memo application as handwriting. The handwriting includes strokes, and each of the strokes may be one stick or point in a writing or picture (for example, a figure). The stroke may include points (for example, feature points), and the processor 120 may acquire feature points from the stroke and analyze the stroke on the basis of the acquired feature points. When it is required to store a handwriting file including the handwriting, the processor 120 may analyze strokes according to the handwriting input. Alternatively, and/or additionally, the processor 120 may analyze strokes according to the handwriting input in real time while the handwriting is input.

In operation 203, the processor 120 may generate and store search data on the basis of the analyzed strokes. The search data may include text information indicating which characters or numbers correspond to the handwriting. For example, the processor 120 may determine line (or lines) of the handwriting on the basis of the analyzed strokes and generate search data for each line. The search data may include at least one of a search type, a page width, a stroke area, or recognized text. The search type may be a value used for a search, the page width may be a location value (or location coordinate) of the strokes, the stroke area may be an area in which strokes exist, and the recognized text may include characters recognized in accordance with the handwriting.

The processor 120 may determine whether the handwriting corresponds to characters (or text) on the basis of the analyzed strokes. The characters (text or letters) may be a visual symbol system used for writing human languages and may include numbers or letters of the language of each country. The processor 120 may identify which country corresponds to the handwriting or whether the handwriting is a number, and may insert the same into recognized text of the search data. When the handwriting file includes three lines, the processor 120 may generate three pieces of search data and store the generated three pieces of search data in a search database. The search database may include a memory (for example, the memory 130 of FIG. 1). Since the search data is generated in the form of a binary code that can be recognized by the processor 120, the search data may have a relatively small capacity (or size).

According to one or more embodiments, after generating all of the search data for all lines included in the handwriting file, the processor 120 may perform operation 205. For example, when the handwriting file includes three lines, the processor 120 may generate first search data through third search data corresponding to the first line through the third line, respectively, and then generate first action link data through third action link data corresponding to the first line through the third line, respectively.

Alternatively, and/or additionally, the processor 120 may sequentially generate search data and action link data for respective lines of the handwriting file. For example, when the handwriting file includes three lines, the processor 120 may generate first search data and first action link data corresponding to the first line, generate second search data and second action link data corresponding to the second line, and then generate third search data and third action link data corresponding to the third line.

Alternatively, and/or additionally, when receiving an input indicating completion of the handwriting from the user, the processor 120 may simultaneously generate search data and action link data. For example, when the user inputs the first line, the second line, or the third line into the handwriting file and then receives an input of completing the handwriting, the processor 120 may simultaneously generate first search data and first action link data corresponding to the first line, second search data and second action link data corresponding to the second line, and third search data and third action link data corresponding to the third line. In operation 205, the processor 120 may generate and store action link data on the basis of analyzed strokes. The action link data may be to provide an icon related to a function so that the function (for example, a phone call or an email address) corresponding to handwriting can be executed. Since it takes a recognition time to provide action link data to handwriting, a database for the action link data is constructed in advance. When storing the handwriting file, the processor 120 may generate action link data and store the action link data in the action link database. The action link database may be included in the memory 130. The action link data is generated in the form of a binary code that can be recognized by the processor 120, and thus may have a relatively small capacity (or size). The processor 120 may determine lines (or sticks) of the handwriting on the basis of the analyzed strokes and generate action link data for each line.

For example, the action link data may include at least one of a link type, a page width, recognized text, a stroke area, a first character area, a last character area, a handle list, and/or a unique value. The link type is differently configured depending on the type of a function for executing action link data and may include, for example, at least one of a phone number, an Internet address for example, a URL (uniform resource locator), an email address, and/or an equation. For example, when the handwriting corresponds to a phone number, the processor 120 may provide a phone call function for directly making a phone call to a phone number corresponding to the handwriting. The processor 120 may distinguish action link data according to the link type and store the action link data in the action link database. The page width is a location value (or coordinate) of strokes and may be the same or similar to the page width of the search data. The recognized text includes characters recognized in accordance with the handwriting and may be the same as or similar to the recognized text of the search data. The stroke area is an area in which strokes exist and may be the same as or similar to the stroke area of the search data. The first character area may be an area for a first located stroke in the stroke area. The last character area may be an area for a last located stroke in the stroke area. The handle list may include an identifier (ID) configured for each stroke included in the stroke area. The processor 120 may configure (or allocate) IDs in the order of strokes included in the stroke area. For example, when the number of strokes included in the stroke area is a total of 3, the processor 120 may configure a first stroke ID as '1', a second stroke ID as '2', and a third stroke ID as '3'. The unique value may be a uniquely designated value by the electronic device 101 generating the action link data. The unique value may be different according to each electronic device generating the action link data.

In operation 207, the processor 120 may generate search-based recognition data including the search data and link flag information. The link flag information is associated with the action link data, and the processor 120 may generate the link flag information on the basis of the action link data. For example, the search-based recognition data may be included in the handwriting file and shared with another user (or counterpart). An electronic device (for example, the electronic device 102 of FIG. 1) of the counterpart receiving sharing of the handwriting file may easily generate action link data on the basis of link flag information included in the search-based recognition data. That is, the link flag information may include information on action link data required (or helping) for generating the action link data.

For example, the link flag information may include at least one of an action link type, stroke information, and/or an index offset. The action line type corresponds to a link type of the action link data and may include, for example, at least one of a phone number, an Internet address, an email address, and/or an equation. The processor 120 may configure (or determine) an action link type of the link flag information in accordance with the link type of the action link data.

Hereinafter, the action link type is divided into four types, but may further include another action link type for providing a function corresponding to handwriting. The example is only to assist with understanding of the disclosure, and the disclosure is not limited by the example. For example, the action link type may be configured as "0" (for example, binary number 00) when the action link type is a phone number, the action link type may be configured as "1" (for example, binary number 01) when the action link type is an Internet address, the action link type may be configured as "2" (for example, binary number 10) when the action link type is an email address, and the action link type may be configured as "3" (for example, binary number 11) when the action link type is an equation. Since the processor 120 generates link flag information for each line when storing the handwriting file, the processor 120 may configure the action link type as a configured value (for example, −1) when the handwriting does not correspond to the action link data. It should be appreciated that the example value of the action link type is only to assist with understanding of the disclosure, and the disclosure is not limited by the description.

The stroke information may include at least one of the total number of strokes, a first stroke ID, and/or a last stroke ID. The processor 120 may generate the stroke information of the link flag information on the basis of at least one of a first character area, a last character area, and/or a handle list included in the action link data. For example, the processor 120 may determine (or configure) the first stroke ID of the link flag information on the basis of the first character area or the handle list of the action link data. The handle list includes stroke IDs included in the stroke area, and thus the processor 120 may determine the first stroke ID on the basis of the first character area or the handle list. The processor 120 may determine the last stroke ID of the link flag information on the basis of the last character area or the handle list of the action link data.

The link flag information may be generated for each line, and stroke information of the second line may be associated with stroke information of the first line (for example, the last stroke ID of the first line). For example, when the number of lines included in the handwriting file is 2 and the total number of strokes included in the first line is "10", the first stroke ID of the first line may be "1" and the last stroke ID of the first line may be "10". When the total number of strokes included in the second line is "7", the first stroke ID of the second line may be "11" and the last stroke ID of the second line may be "17". The stroke information of the first line may be included in first link flag information, and stroke information of the second line may be included in second link flag information.

The index offset may include an offset value for an index for which the next action link data exists. When the handwriting file is shared with a counterpart (for example, the electronic device 102), the index offset may be used for generating link flag information from the shared handwriting file. After generating an action link type or stroke information of the link flag information for each line of the handwriting file, the processor 120 may configure an index offset of each piece of the link flag information last. Alternatively, and/or additionally, when the link flag information is generated for each line while the handwriting file is stored and the next line (for example, second line) does not correspond to the action link data previously generated for the previous line, the processor 120 may configure the index offset of the link flag information of the previous line (for example, first line) as a configured value (for example, −1). The processor 120 may configure the index offset in order to allow the electronic device of the counterpart receiving sharing of the handwriting file to generate the next action link data with reference to the index offset of the first link flag information when generating action link data from the handwriting file. After determining an action link type of the next link flag information, the processor 120 may configure the index offset of the previous link flag information.

For example, when the handwriting file includes 3 lines and only the first line and the third line include an action link (for example, when an action link type is one of 0 to 3), the processor 120 may configure the index offset such that the second link is skipped and action link data of the third line is generated after action line data of the first line is generated. In this case, the processor 120 may configure an index offset of first link flag information of the first line as "2", configure an index offset of second link flag information of the second line as "1", and configure an index offset of third link flag information of the third line as "−1". In this case, since the index offset of the first link flag information is configured as "2" after the first link flag information of the first line is generated from the handwriting file, the electronic device 102 of the counterpart may skip the second line and move to the third line, so as to generate second action link data on the basis of the third link flag information of the third line.

Alternatively, and/or additionally, when the handwriting file includes 3 lines and only the first line and the second line include an action link (for example, when an action link type is one of 0 to 3), the processor 120 may generate action link data of the first line and the second line and then configure the index offset to end the action link data generation operation. In this case, the processor 120 may configure an index offset of first link flag information of the first line as "1", configure an index offset of second link flag information of the second line as "4", and configure an index offset of third link flag information of the third line as "−1". In this case, since the index offset of the first link flag information is configured as "1" after the first action link data of the first line is generated from the handwriting file, the electronic device 102 of the counterpart may move to the second line and generate second action link data on the basis of the second link flag information of the second line. The index offset of the second link flag information is configured as "4", and thus the electronic device 102 of the counterpart may end (or stop) the action link data generation operation without moving to the third line.

The processor 120 may generate search-based recognition data for each line. The processor 120 generates search data and link flag information for each line as well as the action link data, so that the search-based recognition data may include both the search data and the link flag information. In the case of non-action link data, the action link type of the link flag information included in the search-based recognition data may be configured as a configured value (for example, −1).

In operation 209, the processor 120 may store a handwriting file including the generated search-based recognition data. The processor 120 may store the handwriting file in a file database of the memory 130. The handwriting file may be shared with another user. For example, the search-based recognition data includes link flag information associated with action link data, and thus the electronic device 102 of the counterpart receiving the shared handwriting file may easily generate action link data from the search-based recognition data included in the handwriting file.

Figure 3:
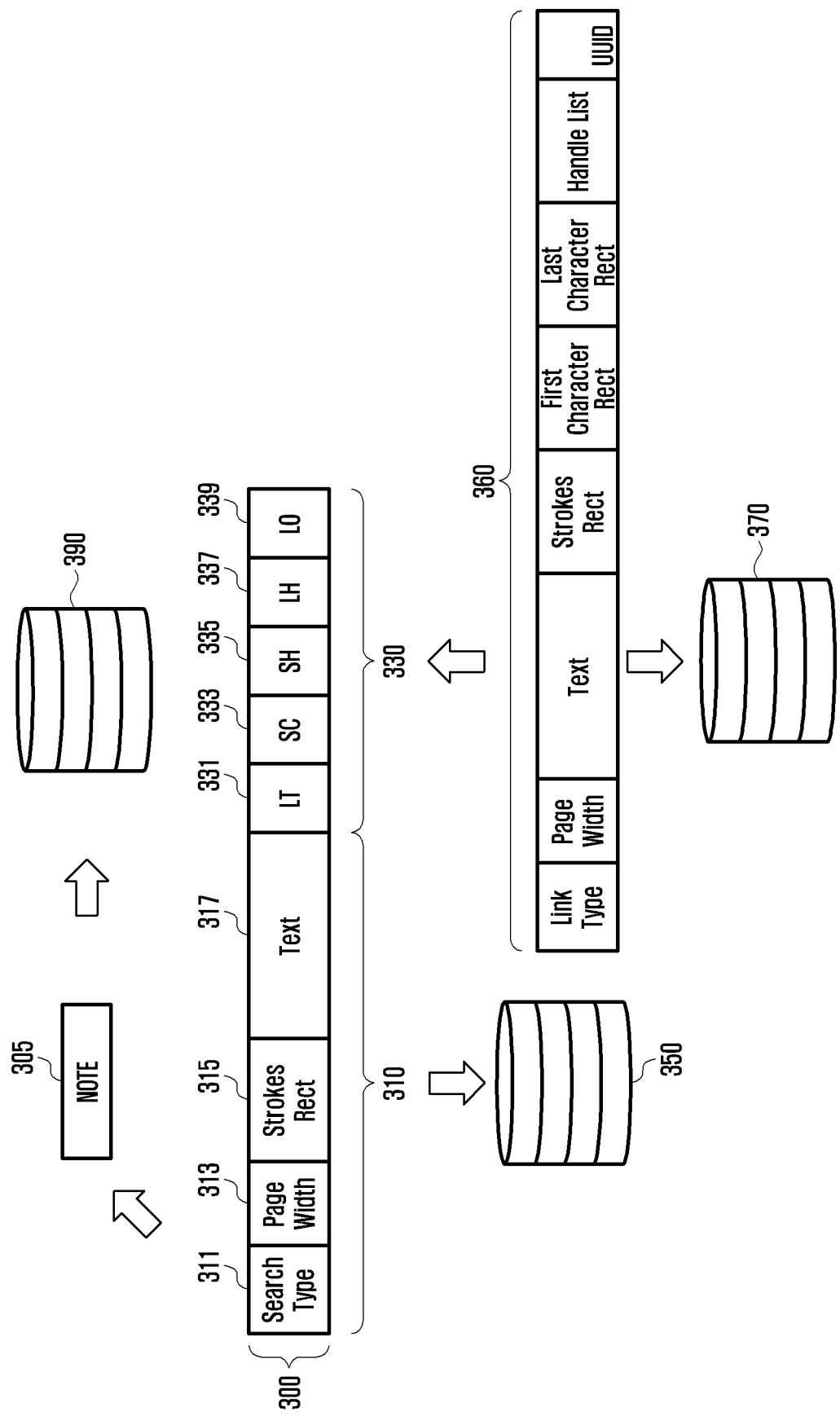
FIG. 3 illustrates an example in which the electronic device generates search-based recognition data associated with handwriting according to various embodiments.

FIG. 3 illustrates an example in which the electronic device generates search-based recognition data associated with handwriting according to various embodiments.

Referring to FIG. 3, a processor (for example, the processor 120 of FIG. 1) of an electronic device (for example, the electronic device 101 of FIG. 1) according to one or more embodiments may generate search data 310 for each line by analyzing strokes from the handwriting input and store the search data 310 in the search database 350. The search data 310 may include at least one of a search type 311, a page width 313, a stroke area (strokes rectangle) 315, and/or recognized text 317. The search type 311 may be a value used for a search, the page width 313 may be a location value (or location coordinate) of strokes, the stroke area 315 may be an area in which strokes exist, and the recognized text 317 may include recognized characters (for example, including letters of languages and numbers) recognized in accordance with handwriting.

Further, the processor 120 may generate action link data 360 for each line on the basis of the analyzed strokes and store the action link data 360 in an action link database 370. The action link data 360 may be to provide an icon associated with a function so that the function (for example, a phone call or an email address) corresponding to handwriting can be executed. The action link data 360 may include at least one of a link type, a page width, recognized text, a stroke area (strokes rectangle), a first character area (first character rectangle), a last character area (last character rectangle), a hand list, and/or a unique value (UUID). The link type may have different configurations depending on the type of function for executing the action link data and may include, for example, at least one of a phone number, an Internet address, an email address, and/or an equation. The processor 120 may distinguish action link data according to the link type and store the action link data in an action link database.

The page width is a location value (or coordinate) of strokes and may be the same or similar to the page width of the search data. The recognized text includes characters recognized in accordance with the handwriting and may be the same as or similar to the recognized text of the search data. The stroke area is an area in which strokes exist and may be the same as or similar to the stroke area of the search data. The first character area may be an area for a first-located stroke in the stroke area. The last character area may be an area for a last located stroke in the stroke area. The handle list may include an identifier (ID) configured for each stroke included in the stroke area. The unique value may be a uniquely designated value by the electronic device 101 generating the action link data. The unique value may be different according to each electronic device generating the action link data.

The processor 120 may generate link flag information 330 on the basis of the action link data 360. The link flag information 330 may include at least one of an action link type (LT) 331, stroke information (SC 333, SH 335, and LH 337), and/or an index offset (LO) 339. The action link type 331 has a different configuration (for example, predefined configuration) depending on the type of an executed function and may include, for example, at least one of a phone number, an Internet address (URL), an email address, and/or an equation. The processor 120 may determine the action link type of the link flag information 330 to correspond to the link type of the action link data 360. The action link type may be configured as "0" (for example, binary number 00) when the action link type is a phone number, the action link type may be configured as "1" (for example, binary number 01) when the action link type is an Internet address, the action link type may be configured as "2" (for example, binary number 10) when the action link type is an email address, and the action link type may be configured as "3" (for example, binary number 11) when the action link type is an equation.

The stroke information may include at least one of the total number of strokes (stroke count (SC)) 333, a first stroke ID (start handle (SH)) 335, and/or a last stroke ID (last handle (LH)) 337. The processor 120 may generate the stroke information of the link flag information 330 on the basis of at least one of the first character area, the last character area, and/or the handle list included in the action link data 360. For example, the processor 120 may determine the first stroke ID of the link flag information 330 on the basis of the first character area or the handle list of the action link data 360. The processor 120 may determine the last stroke ID of the link flag information 360 on the basis of the last character area or the handle list of the action link data 360. The first stroke ID 335 and the last stroke ID 337 may be included in stroke order information.

For example, when the number of lines included in the handwriting file is 2, the processor 120 may generate first link flag information corresponding to the first line and second link flag information corresponding to the second line. When the total number of strokes 333 included in the first link flag information is "10", the first stroke ID 335 of the first link flag information may be "1" and the last stroke ID 337 of the first link flag information may be "10". When the total number of strokes 333 included in the second link flag information is "7", the first stroke ID 335 of the second link flag information may be "11" and the last stroke ID 337 of the second link flag information may be "17". The processor 120 may determine a stroke ID of the second line on the basis of a stroke ID of the first line.

The index offset 339 may include an offset value for an index for which the next action link data exists. When the handwriting file is shared with another user (for example, a counterpart), the index offset 339 may be used when action link data is generated from the shared handwriting file. After generating an action link type or stroke information of the link flag information for each line of the handwriting file, the processor 120 may configure an index offset of each piece of the link flag information last. Alternatively, and/or additionally, when the link flag information is generated for each line while the handwriting file is stored and the next line (for example, second line) does not correspond to action link data, the processor 120 may configure the index offset of the link flag information of the previous line (for example, first line) as a configured value (for example, −1).

When 3 lines are included in the handwriting file, when only the first line and the third line include an action type (for example, the action link type is one of 0 to 3), and when the second line does not include the action link (for example, the action link type is −1), the processor 120 may configure an index offset of first link flag information of the first link as "2", configure an index offset of second link flag information of the second line as "1", and configure an index offset of third link flag information of the third line as "−1".

The processor 120 may generate search-based recognition data 300 including search data 310 and link flag information 330. The processor 120 may store a handwriting file 305 including the search-based recognition data 300 in a handwriting database 390. The handwriting file 305 may be shared with another user. For example, since the search-based recognition data 300 includes the link flag information 330, the electronic device 102 of the counterpart receiving the shared handwriting file 305 may easily generate the link flag information 330 of the search-based recognition data 300 included in the handwriting file 305.

Figure 4:
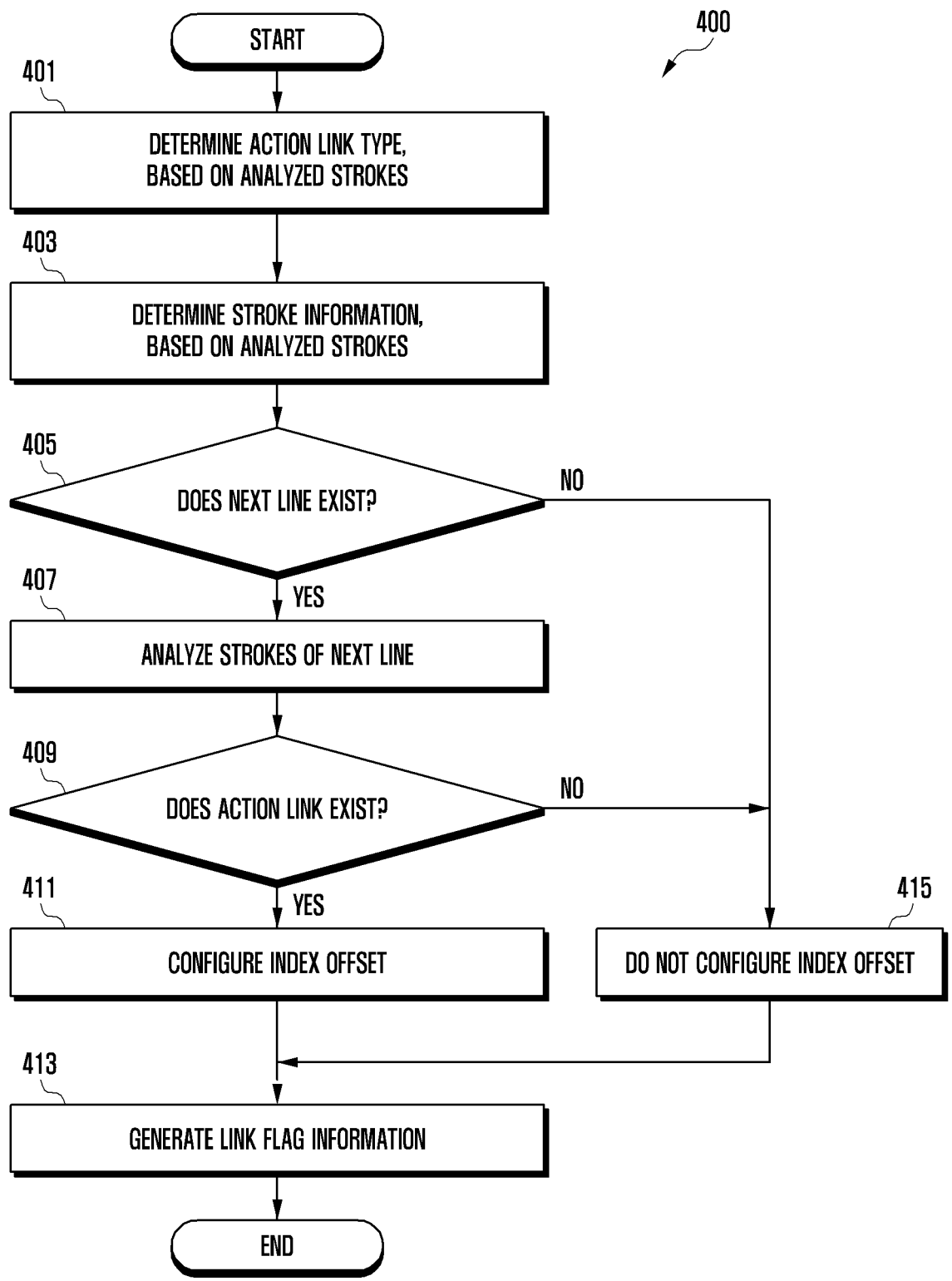
FIG. 4 is a flowchart illustrating a method by which the electronic device generates link flag information associated with handwriting according to various embodiments.

FIG. 4 is a flowchart 400 illustrating a method by which the electronic device generates link flag information associated with handwriting according to one or more embodiments. FIG. 4 illustrates the operation of generating link flag information in operation 207 of FIG. 2 in further detail.

Referring to FIG. 4, in operation 401, a processor (for example, the processor 120 of FIG. 1) of an electronic device (for example, the electronic device 101 of FIG. 1) according to one or more embodiments may determine an action link type on the basis of analyzed strokes. The action link type has different configurations depending on the type of an executed function and may include, for example, at least one of a phone number, an Internet address, an email address, and/or an equation. When the analyzed stroke corresponds to the action link, the processor 120 may configure an action link type (for example, one of 0 to 3) corresponding to the action link. When the analyzed stroke does not correspond to the action link, the processor 120 may configure an action link type as a preset value (for example, −1). The processor 120 may determine an action link type of link flag information on the basis of a link type of action link data generated in operation 205 of FIG. 2.

In operation 403, the processor 120 may determine stroke information on the basis of the analyzed strokes. The stroke information (for example, the SC 333, the SH 335, and the LH 337 of FIG. 3) may include at least one of the total number of strokes (for example, the SC 333 of FIG. 3), a first stroke ID (for example, the SH 335 of FIG. 3) and/or a last stroke ID (for example, the LH 337 of FIG. 3). The link flag information may be generated for each line, and stroke information of the second line may be associated with stroke information of the first line. For example, when the total number of strokes included in the first line is "10", the processor 120 may determine a first stroke ID of the first line as "1" and determine a last stroke ID of the first line as "10". When the total number of strokes included in the second line is "7", the processor 120 may determine a first stroke ID of the second line as "11" and determine a last stroke ID of the second line as "17". The processor 120 may determine the stroke ID of the second line on the basis of the stroke ID of the first line. The first stroke ID and the last stroke ID may be included in stroke order information.

In operation 405, the processor 120 may determine whether the next line exists. The link flag information may be generated for each line. When the first action link type and first stroke information for the first line are determined in operation 401 and operation 403, the next line may be the second line. Alternatively, and/or additionally, when the second action link type and second stroke information for the second line are determined in operation 401 and operation 403, the next line may be a third line. When an action link type and stroke information of link flag information of the first line are generated, the processor 120 may determine whether there is the next line in the handwriting file before configuring an index offset. The processor 120 may perform operation 407 when the next line exists in the handwriting file, and may perform operation 415 when the next line does not exist in the handwriting file.

When the next exists in the handwriting file, the processor 120 may analyze strokes of the next line in operation 407. The stroke may include points (for example, feature points), and the processor 120 may acquire feature points from the stroke and analyze the stroke on the basis of the acquired feature points.

In operation 409, the processor 120 may determine whether an action link exists in the next line. When the stroke of the next line corresponds to at least one of a phone number, an Internet address (URL), an email address, and/or an equation corresponding to the action link type, the processor 120 may determine that the action link exists. Alternatively, and/or additionally, when the stroke of the next line does not correspond to the action link type (for example, the action link type is −1), it may be determined that the action link does not exist. The processor 120 may perform operation 411 when the action link exists in the next line, and may perform operation 415 when the action link does not exist in the next line.

When the action link exists in the next line, the processor 120 may configure the index offset in operation 411. The index offset (for example, the LO 339 of FIG. 3) may include an offset value for an index for which the next action link data exists. When the action link exists in the next line, the processor 120 may configure the index offset as "1". When the first action link type and the first stroke information for the first line are determined in operation 401 and operation 403, the processor 120 may configure a first index offset in operation 411. The first action link type, the first stroke information, and the first index offset may be included in the first link flag information corresponding to the first line. Alternatively, and/or additionally, when the second action type and the second stroke information for the second line are determined in operation 401 and operation 403, the processor 120 may configure a second index offset in operation 411. The second action link type, the second stroke information, and the second index offset may be included in the second link flag information corresponding to the second line.

In operation 413, the processor 120 may generate link flag information. For example, the processor 120 determines the first action link type and the first stroke information for the first line in operation 401 and operation 403 and configures (or does not configure) the first index offset in operation 411 or operation 415, and thus may complete generation of the first link flag information corresponding to the first line and insert the first link flag information into first search-based recognition data. After completing the generation of the first link flag information, the processor 120 may return to operation 401 and perform an operation of generating link flag information for the second line. The processor 120 determines the second action link type and the second stroke information for the second line in operation 401 and operation 403 and configures (or does not configure) the second index offset in operation 411 or operation 415, and thus may complete generation of the second link flag information corresponding to the second line and insert the second link flag information into second search-based recognition data. After storing the second link flag information, the processor 120 may return to operation 401 and perform an operation of generating link flag information for the third line.

When the next line does not exist or the action link does not exist in the next line, the processor 120 may not configure the index offset in operation 415. Not configuring the index offset may mean that there is no index offset value or the index offset is configured as a preset value (for example, −1). For example, when the first action link type and the first stroke information for the first line are determined in operation 401 and operation 403, the processor 120 may not configure the first index offset in operation 415. The first action link type, the first stroke information, and the first index offset may be included in the first link flag information corresponding to the first line. Alternatively, and/or additionally, when the second action link type and the second stroke information for the second line are determined in operation 401 and operation 403, the processor 120 may not configure the second index offset in operation 415. The second action link type, the second stroke information, and the second index offset may be included in the second link flag information corresponding to the second line. After performing operation 415, the processor 120 may perform operation 413.

According to one or more embodiments, when the next line does not exist, the processor 120 may generate link flag information including the action link type and the stroke information determined in operation 401 and operation 403 and the index offset which is not configured in operation 415, insert the generated link flag information into search-based recognition data, and then end the process.

According to one or more embodiments, when the next line exists but the action link does not exist in the next line, the processor 120 may generate link flag information including the action link type and the stroke information determined in operation 401 and operation 403 and the index offset which is not configured in operation 415, insert the generated link flag information into search-based recognition data, and then return to operation 401 to perform an operation of generating link flag information for the next line.

Figure 5:
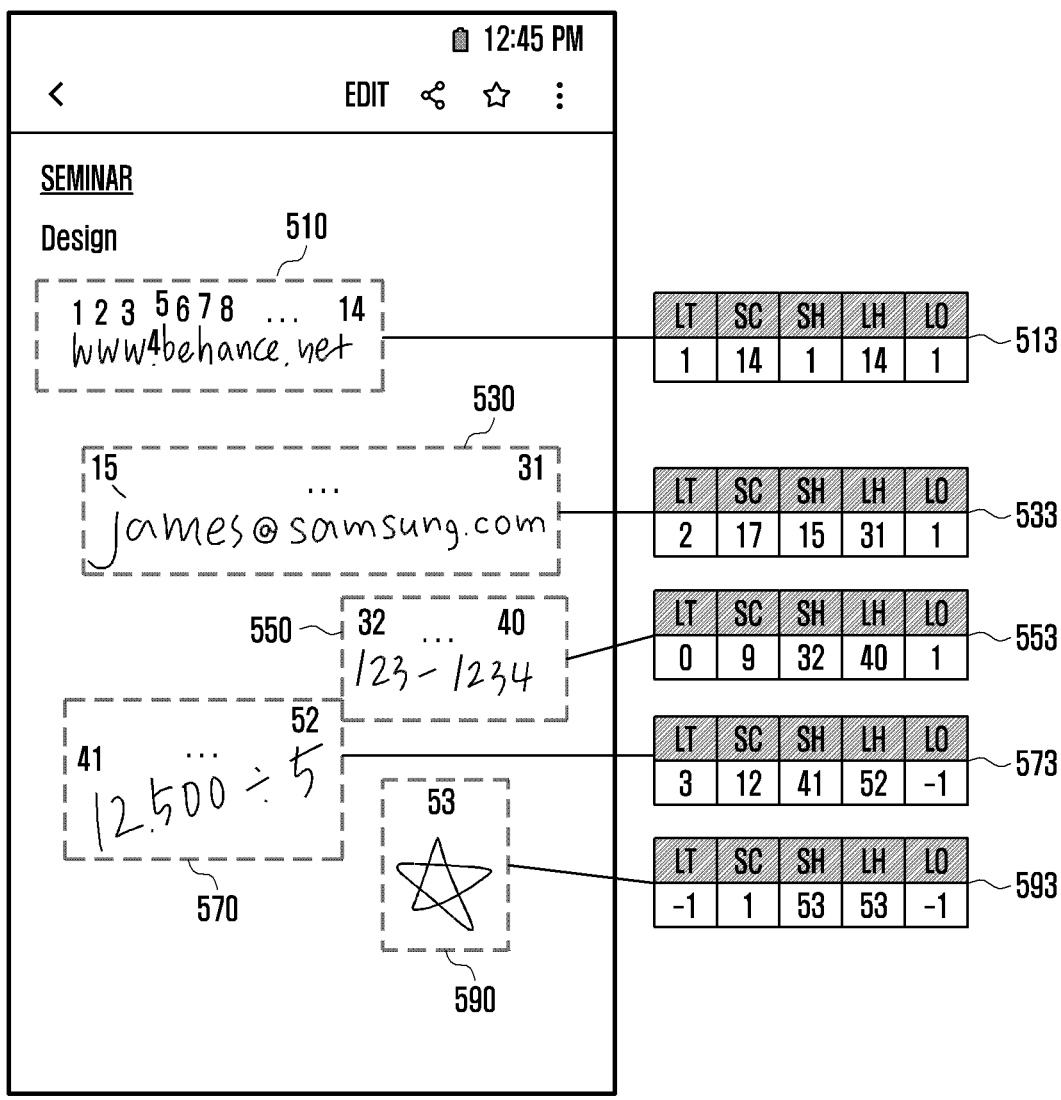
FIG. 5 illustrates an example in which the electronic device generates link flag information associated with handwriting according to various embodiments.

FIG. 5 illustrates an example in which the electronic device generates link flag information associated with handwriting according to various embodiments.

Referring to FIG. 5, a processor (for example, the processor 120 of FIG. 1) of an electronic device (for example, the electronic device 101 of FIG. 1) according to one or more embodiments may analyze strokes of handwriting included in a handwriting file 500. For example, the processor 120 may generate first search data and first action link data by analyzing strokes included in a first line 510 from the handwriting file 500. The processor 120 may generate first link flag information 513 on the basis of the generated first action link data. Alternatively, and/or additionally, the processor 120 may generate the first link flag information 513 by analyzing strokes of the first line 510. The processor 120 may generate first search-based recognition data including the first search data and the first link flag information 513. The first link flag information 513 may include an action link type (LT) corresponding to "1" (for example, an Internet address), the total number of strokes (SC) corresponding to "14", a first stroke ID (SH) corresponding to "1", a last stroke ID (LH) corresponding to "14", and an index offset (LO) corresponding to "1".

The processor 120 may generate second search data and second action link data by analyzing strokes included in a second line 530 from the handwriting file 500. The processor 120 may generate second link flag information 533 on the basis of the generated second action link data. Alternatively, and additionally, the processor 120 may generate the second link flag information 533 by analyzing strokes of the second line 530. The processor 120 may generate second search-based recognition data including the second search data and the second link flag information 533. The second link flag information 533 may include an action link type (LT) corresponding to "2" (for example, an email address), the total number of strokes (SC) corresponding to "17", a first stroke ID (SH) corresponding to "15", a last stroke ID (LH) corresponding to "31", and an index offset (LO) corresponding to "1". The first stroke ID (SH) of the second line 530 may be associated with the last stroke ID (LH) of the first line 510.

The processor 120 may generate third search data and third action link data by analyzing strokes included in a third line 550 from the handwriting file 500. The processor 120 may generate third link flag information 553 on the basis of the generated third action link data. Alternatively, and/or additionally, the processor 120 may generate the third link flag information 553 by analyzing strokes of the third line 550. The processor 120 may generate third search-based recognition data including the third search data and the third link flag information 553. The third link flag information 553 may include an action link type (LT) corresponding to "0" (for example, a phone number), the total number of strokes (SC) corresponding to "9", a first stroke ID (SH) corresponding to "32", a last stroke ID (LH) corresponding to "40", and an index offset (LO) corresponding to "1". The first stroke ID (SH) of the third line 550 may be associated with the last stroke ID (LH) of the second line 530.

The processor 120 may generate fourth search data and fourth action link data by analyzing strokes included in a fourth line 570 from the handwriting file 500. The processor 120 may generate fourth link flag information 573 on the basis of the generated fourth action link data. Alternatively, and/or additionally, the processor 120 may generate fourth link flag information 573 by analyzing strokes of the fourth line 570. The processor 120 may generate fourth search-based recognition data including the fourth search data and the fourth link flag information 573. The fourth link flag information 573 may include an action link type (LT) corresponding to "3" (for example, an equation), the total number of strokes (SC) corresponding to "12", a first stroke ID (SH) corresponding to "41", a last stroke ID (LH) corresponding to "52", and an index offset (LO) corresponding to "−1". The first stroke ID (SH) of the fourth line 570 may be associated with the last stroke ID (LH) of the third line 550.

The processor 120 may generate fifth search data by analyzing strokes included in a fifth line 590 from the handwriting file 500. Since no action link is included in the fifth line 590, the processor 120 may not generate fifth action link data. The processor 120 may generate fifth link flag information 593 by analyzing strokes of the fifth line 590. The processor 120 may generate fifth search-based recognition data including the fifth search data and the fifth link flag information 593. The fifth link flag information 593 may include an action link type (LT) corresponding to "−1" (for example, not action link), the total number of strokes (SC)

corresponding to "1", a first stroke ID (SH) corresponding to "53", a last stroke ID (LH) corresponding to "53", and an index offset (LO) corresponding to "4". The first stroke ID (SH) of the fifth line 590 may be associated with the last stroke ID (LH) of the fourth line 570.

Figure 6A:
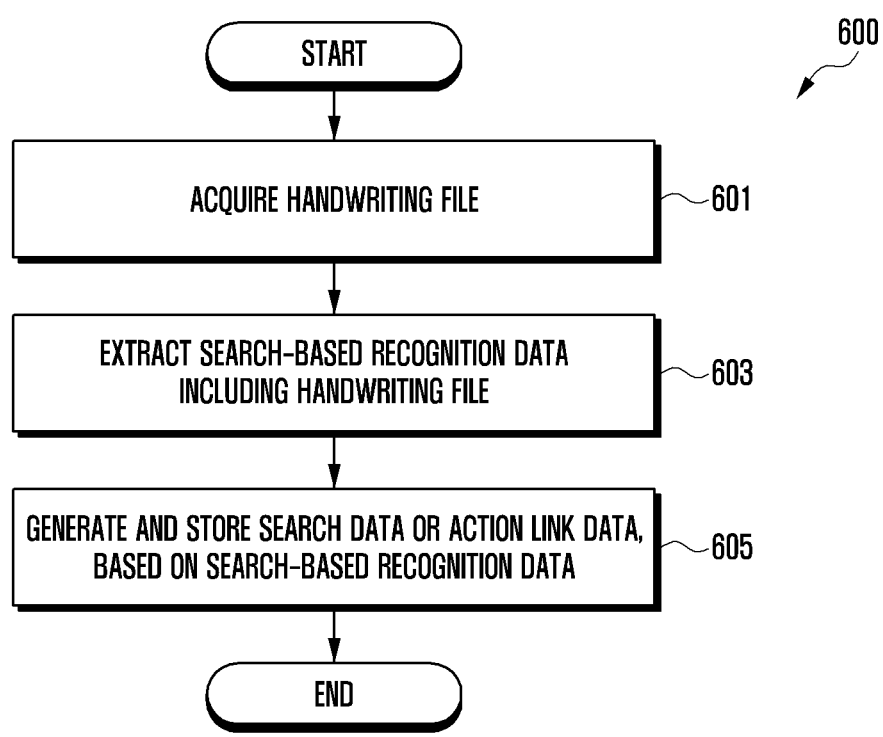
FIGS. 6A and 6B are flowcharts illustrating a method by which the electronic device generates search data or action link data from a shared handwriting file according to various embodiments.
Figure 6B:
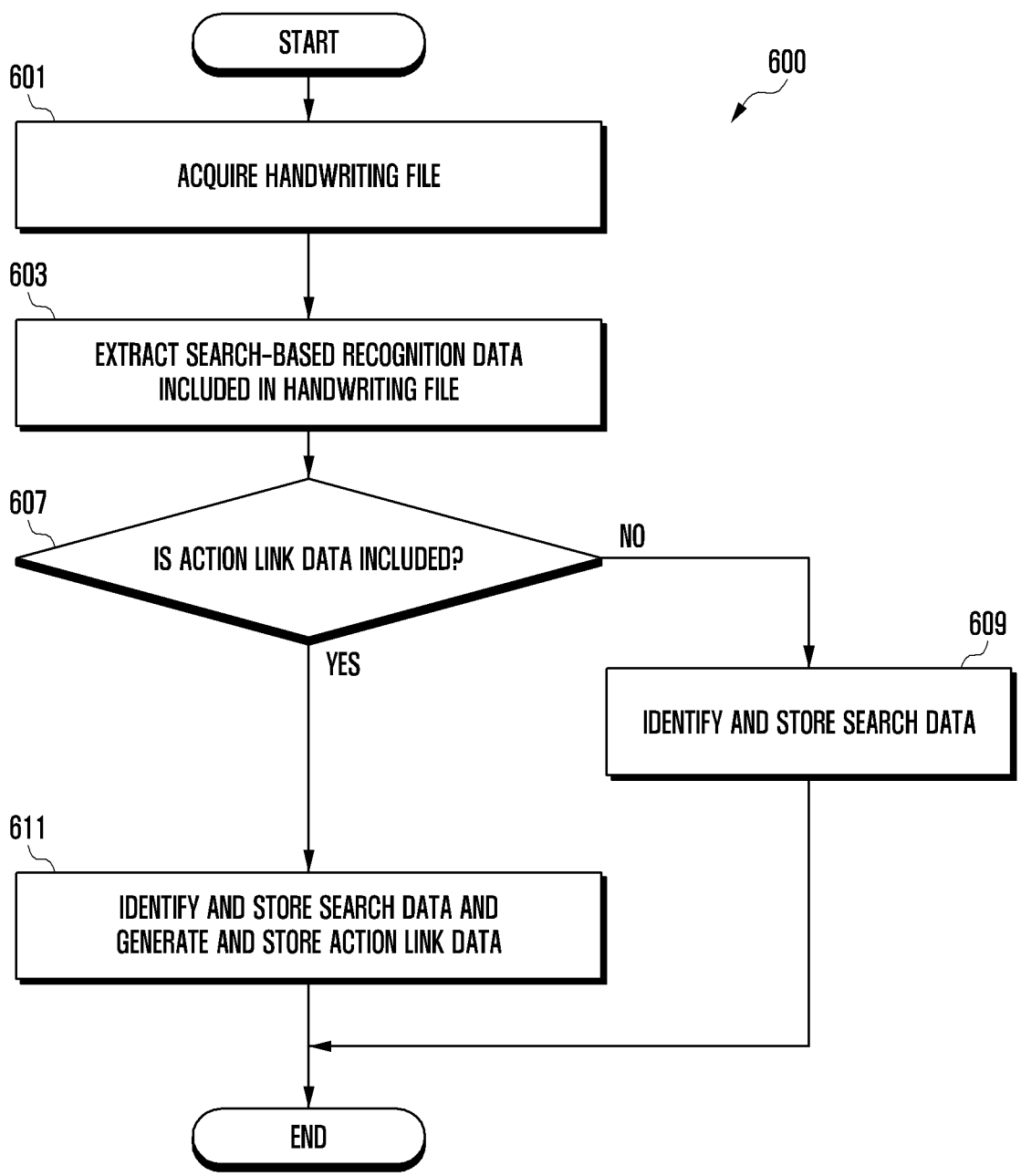

FIGS. 6A and 6B are flowcharts 600 illustrating a method by which the electronic device generates search data or action link data from a shared handwriting file according to various embodiments.

Referring to FIG. 6A, in operation 601, a processor (for example, the processor 120 of FIG. 1) of an electronic device (for example, the electronic device 101 of FIG. 1) according to one or more embodiments may acquire a handwriting file. The processor 120 may receive the handwriting file from an external electronic device (for example, the electronic device 102 of FIG. 1) or an external server (for example, the server 108 of FIG. 1) through a communication module (for example, the communication module 190 of FIG. 1). The handwriting file may include search-based recognition data. The processor 120 may store the handwriting file in a memory (for example, the memory 130 of FIG. 1).

In operation 603, the processor 120 may extract search-based recognition data included in the handwriting file. The search-based recognition data may include search data and link flag information generated for each line of the handwriting file. The link flag information may be associated with action link data. The action link data may be to provide an icon related to a function so that the function (for example, a phone call or an email address) corresponding to handwriting can be executed. Since it takes a recognition time to provide action link data to handwriting, a database for the action link data is constructed in advance.

In operation 605, the processor 120 may generate and store search data or action link data on the basis of the extracted search-based recognition data. After identifying and storing the search data on the basis of the search-based recognition data, the processor 120 may generate and store action link data on the basis of link flag information included in the search-based recognition data. That is, FIG. 6A illustrates a method of separately performing an operation of generating search data and an operation of generating action link data. When the action link data is generated through a method which is the same as that in FIG. 6A, the processor 120 may generate action link data with reference to an index offset of the link flag information. A detailed description corresponding to FIG. 6A is made below with reference to FIG. 9. According to an embodiment, the processor 120 may simultaneously identify and store search data and action link data on the basis of the search-based recognition data.

The search-based recognition data may include both the search data and the link flag information, but the processor 120 may not generate action link data for the link flag information of which an action link type is configured as a preset value (for example, −1). For example, when the handwriting file includes 3 pieces of search-based recognition data, the processor 120 may identify 3 pieces of search data. When one action link type of the 3 pieces of search-based recognition data is configured as a preset value, the processor 120 may generate 2 pieces of action link data. The processor 120 may generate action link data only when the action link type of the 3 pieces of search-based recognition data corresponds to at least one of a phone number, an Internet address, an email address, and/or an equation.

Referring to FIG. 6B, since operation 601 and operation 603 are the same as or similar to FIG. 6A, a description thereof may be omitted. FIG. 6B illustrates a method of simultaneously storing search data and action link data on the basis of the search-based recognition data.

In operation 607, the processor 120 may determine whether the search-based recognition data includes action link data. The processor 120 may determine whether the action link data is included by parsing the search-based recognition data to identify an action link type of link flag information included in search-based recognition data sequentially for respective lines. For example, the processor 120 may determine whether a first action link type of first link flag information included in the first search-based recognition data corresponds to at least one of a phone number, an Internet address, an email address, and/or an equation. The processor 120 may perform operation 611 when the first action link type corresponds to at least one of the phone number, the Internet address, the email address, and/or the equation, and may perform operation 609 when the first action link type does not correspond to at least one of the phone number, the Internet address, the email address, and/or the equation.

When the action link data is not included in the search-based recognition data, the processor 120 may identify and store search data in operation 609. The processor 120 may identify the search data included in the search-based recognition data and store the search data in a search database.

When the action link data is included in the search-based recognition data, the processor 120 may identify and store search data and generate and store action link data in operation 611. The processor 120 may identify the search data included in the search-based recognition data and store the search data in the search database. Further, the processor 120 may generate and store action link data on the basis of link flag information included in the search-based recognition data.

According to one or more embodiments, after identifying and storing first search data or first action link data corresponding to the first line, the processor 120 may determine whether action link data is included in second search-based recognition data corresponding to the second line. The processor 120 may simultaneously generate search data and action link data for each line. A detailed description corresponding to FIG. 6B is made below with reference to FIG. 10.

Figure 7:
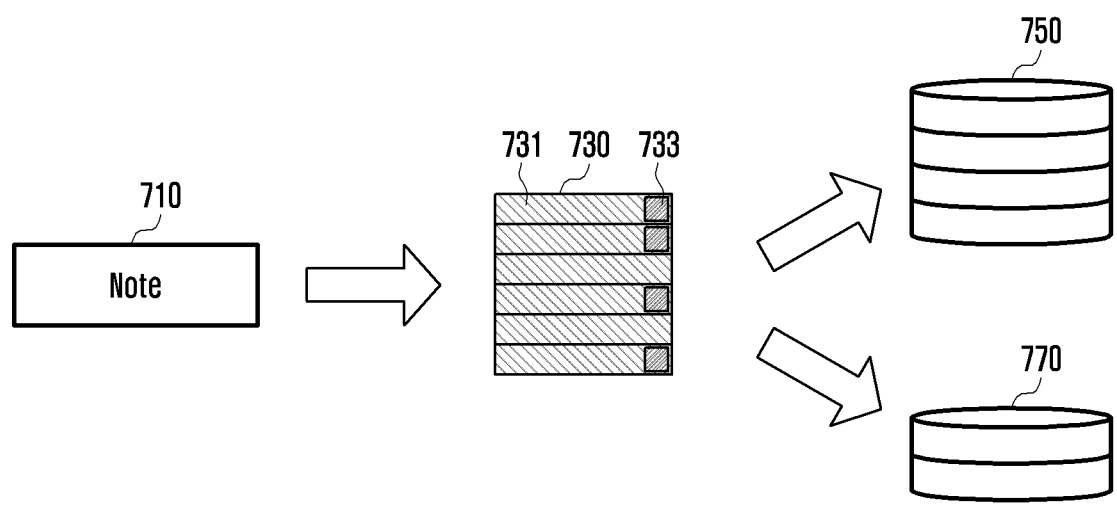
FIG. 7 illustrates an example in which the electronic device generates search data or action link data from a shared handwriting file according to various embodiments.

FIG. 7 illustrates an example in which the electronic device generates search data or action link data from a shared handwriting file according to various embodiments.

Referring to FIG. 7, a processor (for example, the processor 120 of FIG. 1) of an electronic device (for example, the electronic device 101 of FIG. 1) according to one or more embodiments may acquire a handwriting file 710. The handwriting file 710 may be received from an external electronic device (for example, the electronic device 102 of FIG. 1) or an external server (for example, the server 108 of FIG. 1). The handwriting file 710 may be stored in a memory (for example, the memory 130 of FIG. 1). The handwriting file 710 may include search-based recognition data 730. The processor 120 may extract the search-based recognition data 730 from the handwriting file 710. The search-based recognition data 730 may include search data 731 and link flag information 733. The processor 120 may identify the search data 731 on the basis of the search-based recognition data 730 and store the search data 731 in a search database 750. The processor 120 may generate action link data on the basis of the link flag information 733 of the search-based recognition data 730 and store the action link data in an action link database 770. The search database 750 and the action link database 770 may be included in the memory 130. The processor 120 may separately or simultaneously generate the search data 731 and the action link data.

Figure 8:
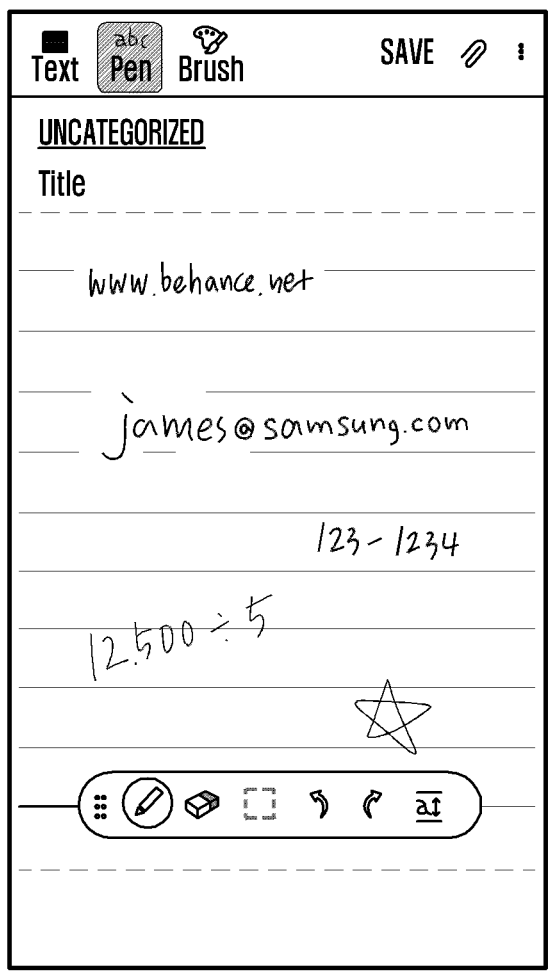
FIG. 8 illustrates an example in which the electronic device provides action link data to a shared handwriting file according to various embodiments.
Figure 8:
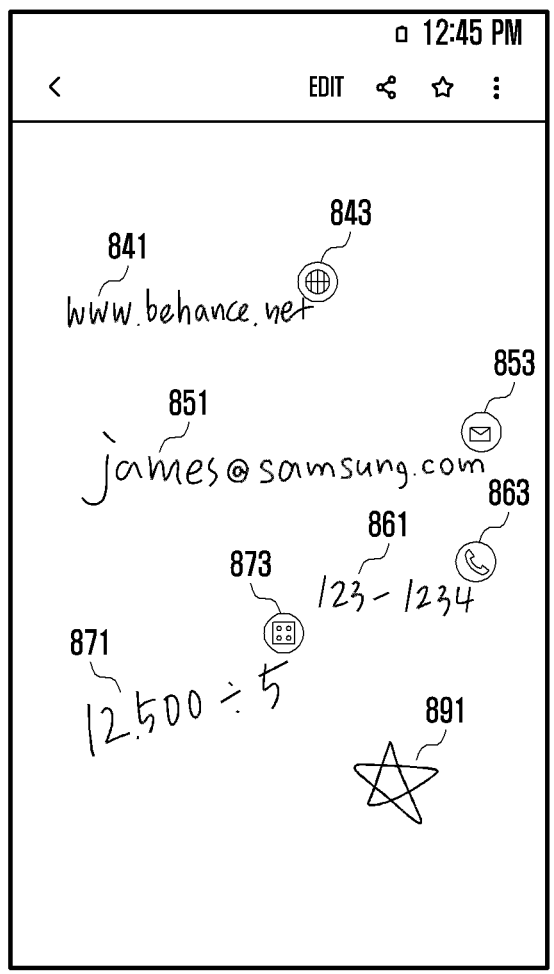

FIG. 8 illustrates an example in which the electronic device provides action link data to a shared handwriting file according to various embodiments.

Referring to FIG. 8, a processor (for example, the processor 120 of FIG. 1) of an electronic device (for example, the electronic device 101 of FIG. 1) according to according to embodiments may acquire a handwriting file 810. The handwriting file 810 may include search-based recognition data (for example, the search-based recognition data 730 of FIG. 7). The processor 120 may extract search-based recognition data from the handwriting file 810. The search-based recognition data may include search data (for example, the search data 731 of FIG. 7) and link flag information. The processor 120 may identify the search data 731 on the basis of the search-based recognition data 730 and generate action link data. The processor 120 may store the search data 731 and the generated action link data. After storing the search data 731 and the action link data, the processor 120 may provide a user interface 830 including an action link in the handwriting.

The user interface 830 may provide a first action link 843 (for example, an Internet access application icon) according to handwriting 841 of a first line, provide a second action link 843 (for example, an email sending application icon) according to handwriting 851 of a second line, provide a third action link 863 (for example, a phone call application icon) according to handwriting 861 of a third line, and provide a fourth action link 873 (for example, a calculator application icon) according to handwriting 871 of a fourth line. Since handwriting 891 of a fifth line is not the action link, no action link may be provided.

Figure 9:
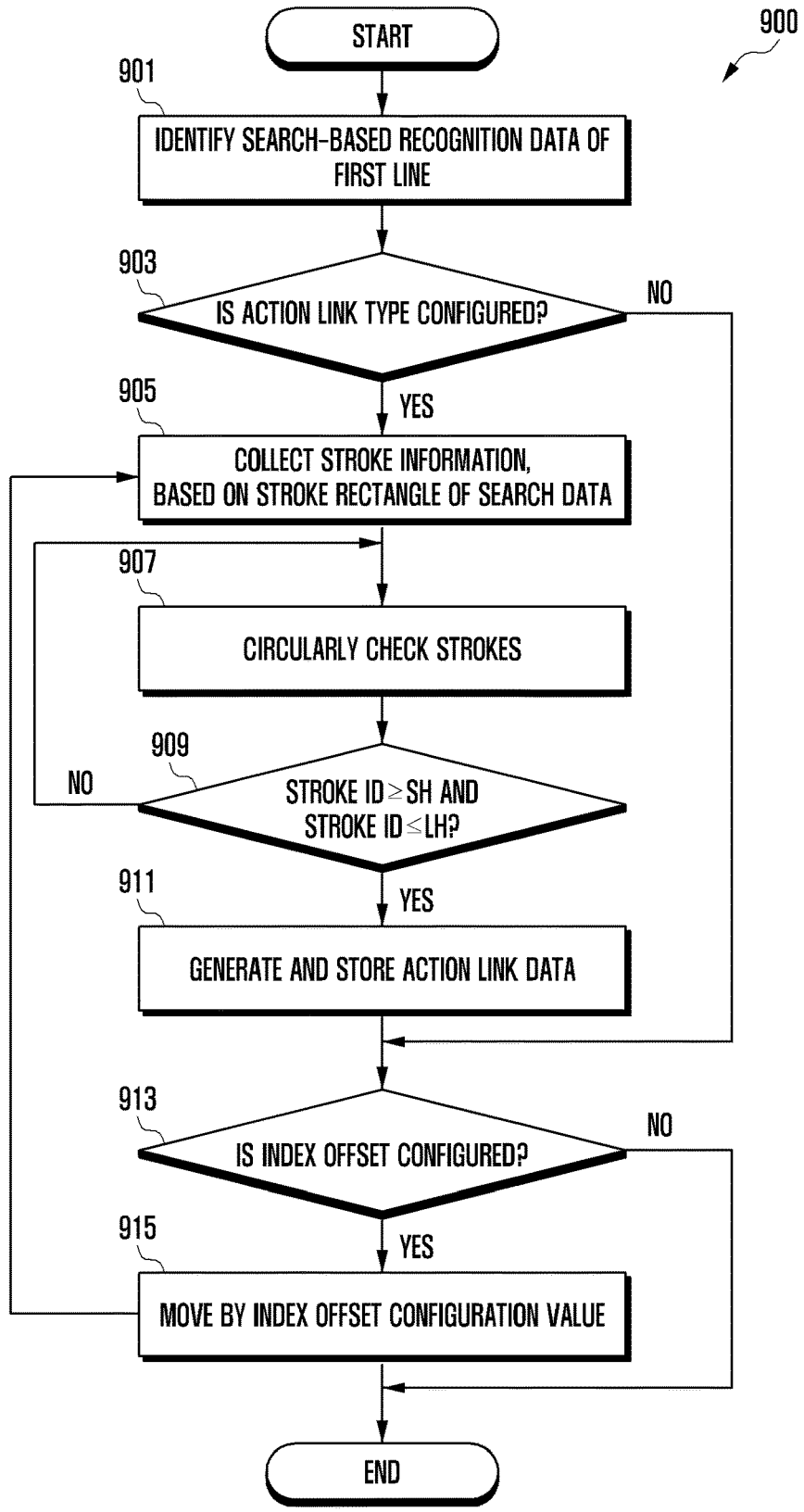
FIG. 9 is a flowchart illustrating a method by which the electronic device generates action link data from the shared handwriting file according to various embodiments.

FIG. 9 is a flowchart 900 illustrating a method by which the electronic device generates action link data from a shared handwriting file according to various embodiments. FIG. 9 illustrates in detail the operation of generating and storing the action link data of FIG. 6A.

Referring to FIG. 9, in operation 901, a processor (for example, the processor 120 of FIG. 1) of an electronic device (for example, the electronic device 101 of FIG. 1) according to one or more embodiments may identify search-based recognition data of a first line. The handwriting file may include search-based recognition data for each line. The search-based recognition data may include search data and link flag information. The search data may include at least one of a search type, a page width, a stroke area, and/or recognized text. The link flag information is associated with action link data and may include information on the action link data. The link flag information may include at least one of an action link type, stroke information (for example, the SC 333, the SH 335, and the LH 337 of FIG. 3), or an index offset. The processor 120 may identify (or extract) first search-based recognition data corresponding to the first line among the search-based recognition data included in the handwriting file. Operation 901 may be performed after search data for each line is all identified and stored on the basis of the search-based recognition data.

In operation 903, the processor 120 may determine whether an action link type is configured. The configured action link type may mean that the action link type included in the link flag information of the search-based recognition data corresponds to at least one of a phone number, an Internet address, an email address, and/or an equation. The action link type which is not configured may mean that the action link type included in the link flag information does not correspond to at least one of a phone number, an Internet address, an email address, and/or an equation.

The processor 120 may perform operation 905 when the action link type is configured and may perform operation 913 when the action link type is not configured.

When the action link type is configured, the processor 120 may collect stroke information on the basis of a stroke area of the search data in operation 905. The stroke information may include all strokes included in one line.

In operation 907, the processor 120 may circularly check strokes included in stroke information. Circularly checking the strokes may be identifying stroke IDs (for example, stroke identifiers) while circularly checking the strokes from the first stroke to the last stroke included in one line. For example, the processor 120 may identify a first stroke ID included in one line and perform operation 909 in the first circular checking, and may identify a second stroke ID included in one line and perform operation 909 in a second circular checking.

In operation 909, the processor 120 may determine whether the stroke ID is larger than or equal to the first stroke ID (SH) and equal to or smaller than the last stroke ID (LH). The first stroke ID and the last stroke ID may be included in stroke order information. The processor 120 may determine whether the stroke ID corresponds to the stroke order information. The link flag information of the search-based recognition data may include stroke information, and the stroke information may include the total number of strokes (SC) and stroke order information (for example, the SH 335 and the LH 337 of FIG. 3). The processor 120 may identify (or configure) the first stroke ID (SH) and the last stroke ID (LH) on the basis of first stroke information included in the first link flag information corresponding to the first line.

When the line is changed, the processor 120 may identify the first stroke ID (SH) and the last stroke ID (LH) on the basis of stroke information included in the link flag information corresponding to the changed line. When the line is changed, the stroke order information is changed, and thus the processor 120 may determine whether the stroke ID corresponds to stroke order information of the changed line. For example, when the line is changed to a third line, the processor 120 may identify the first stroke ID (SH) and the last stroke ID (LH) on the basis of stroke information included in the third link flag information corresponding to the third line.

When the first stroke ID is larger than or equal to the first stroke ID (SH) and equal to or smaller than the last stroke ID (LH), the processor 120 may return to operation 907 and circularly check the second stroke. When the second stroke ID is larger than or equal to the first stroke ID (SH) and equal to or smaller than the last stroke ID (LH), the processor 120 may return to operation 907 and circularly check the third stroke. The processor 120 may repeatedly perform operation 907 and operation 909 until the stroke ID is larger than or equal to the first stroke ID (SH) and equal to smaller than the last stroke ID (LH). When the stroke ID is larger than or equal to the first stroke ID (SH) and equal to or smaller than the last stroke ID (LH), the processor 120 may perform operation 911.

In operation 911, the processor 120 may generate and store action link data. For example, when operation 901 to operation 909 are sequentially performed once, the processor 120 may generate and store first action link data. Thereafter, when operation 903 to operation 909 are sequentially performed twice, the processor 120 may generate and store second action link data. The generated action link data may be stored in an action link database.

When the action link data is generated and stored or when the action link type is not configured, the processor 120 may determine whether an index offset is configured on the basis of link flag information in operation 913. For example, after generating and storing the first action link data on the basis of first search-based recognition data corresponding to the first line, the processor 120 may identify an index offset of the first link flag information included in the first search-based recognition data. The index offset may be a configured index offset value for which the next action link data exists. When the action link type is not configured, the processor 120 may determine whether the index offset is configured on the basis of the search-based recognition data and, when the index offset is not configured, may end the process.

The processor 120 may perform operation 915 when the index offset is configured, and end the process when the index offset is not configured. When the index offset is not configured, there is no next action link data, and thus the action link data generation operation may end.

When the index offset is configured, the processor 120 may move by a value configured in the index offset in operation 915. For example, when the index offset included in the first link flag information is configured as "1" after the first action link data of the first line is generated, the processor 120 may move to the second line and perform operation 905. Alternatively, and/or additionally, when the index offset included in the first link flag information is configured as "2" after the first action link data of the first line is generated, the processor 120 may move to the third line and perform operation 905. The processor 120 may move by a value configured in the index offset and then return to operation 905. The processor 120 may directly move to the line in which the action link exists and generate action link data with reference to an index offset of link flag information included in search-based recognition data without determining whether the action link exists with respect to all lines included in the handwriting file. The processor 120 may improve a generation and recognition speed of the action link data on the basis of the index offset.

Figure 10:
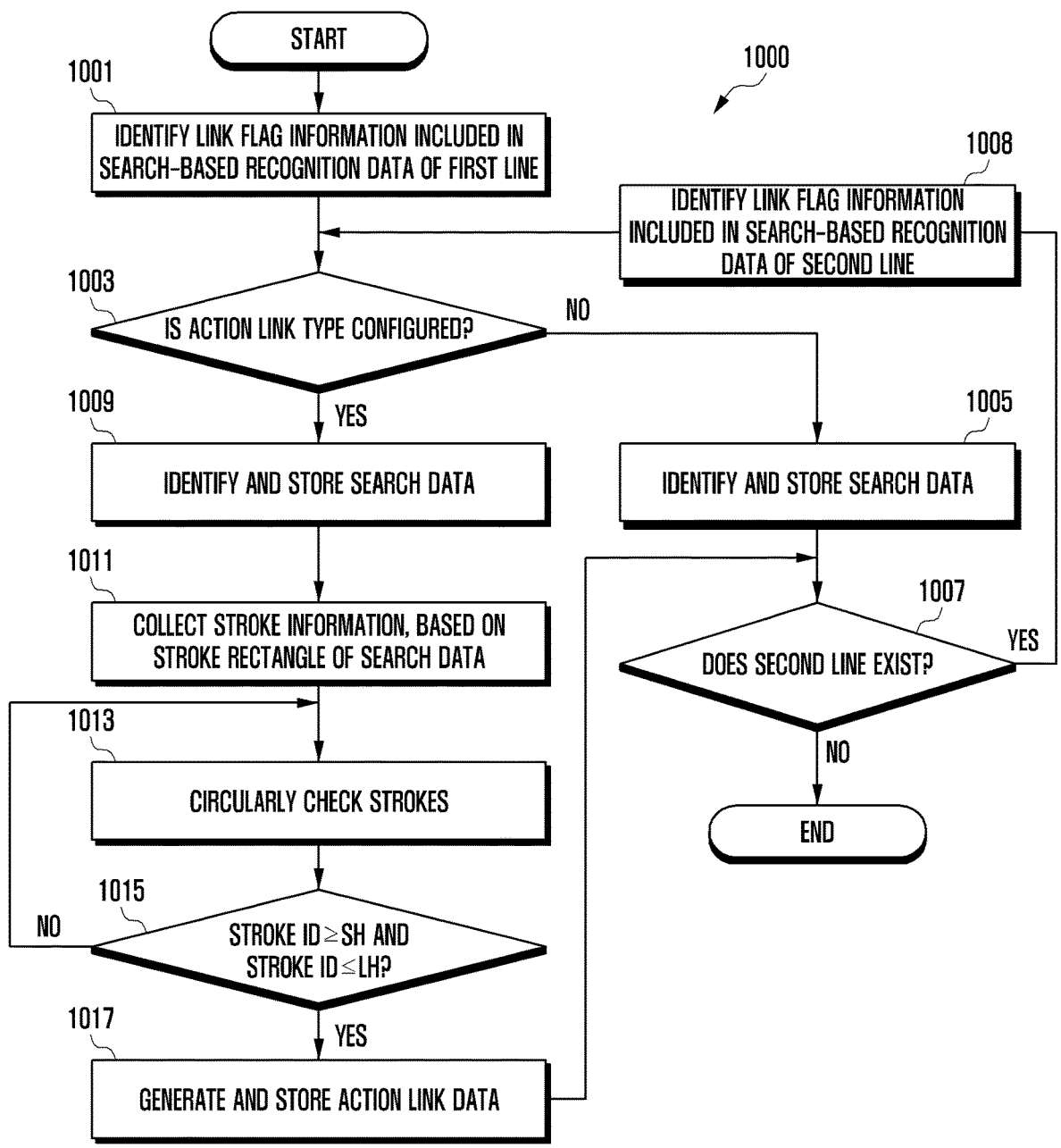
FIG. 10 is a flowchart illustrating a method by which the electronic device identifies search data and generates action link data from the shared handwriting file according to various embodiments.

FIG. 10 is a flowchart 1000 illustrating a method by which the electronic device generates search data and action link data from a shared handwriting file according to various embodiments. FIG. 10 describes in detail operation 607 to operation 611 of FIG. 6B.

Referring to FIG. 10, in operation 1001, a processor (for example, the processor 120 of FIG. 1) of an electronic device (for example, the electronic device 101 of FIG. 1) may identify link flag information (for example, the first link flag information) included in search-based recognition data of the first line. The handwriting file may include search-based recognition data for each line. The search-based recognition data may include search data and link flag information. The search data may include at least one of a search type, a page width, a stroke area, or recognized text. The link flag information is associated with action link data and may include information on the action link data. For example, the link flag information may include at least one of an action link type, stroke information (for example, the SC 333, the SH 335, and the LH 337 of FIG. 3), and/or an index offset. The processor 120 may identify (or extract) first search-based recognition data corresponding to the first line among the search-based recognition data included in the handwriting file.

In operation 1003, the processor 120 may determine whether an action link type is configured. The configured action link type may mean that the action link type included in the link flag information of the search-based recognition data corresponds to at least one of a phone number, an Internet address, an email address, and/or an equation. The action link type which is not configured may mean that the action link type included in the link flag information does not correspond to at least one of a phone number, an Internet address, an email address, and/or an equation.

The processor 120 may perform operation 1009 when the action link type is configured, and may perform operation 1005 when the action link type is not configured.

When the action link type is not configured, the processor 120 may identify and store search data in operation 1005. Since no action link is included in the first search-based recognition data included in the first line, the processor 120 may identify first search data from the first search-based recognition data corresponding to the first line and store the first search data in a search database.

In operation 1007, the processor 120 may determine whether there is a second line (for example, the next line). For example, since the first search data corresponding to the first line was identified and stored in operation 1001 to operation 1005, the processor 120 may determine whether the second line is included in the handwriting file. When the second line exists in the handwriting file, processor 120 may perform operation 1008. When no second line exists in the handwriting file, the operation of identifying search data or the operation of generating action link file with respect to the handwriting file is not needed any more, and thus the processor 120 may end the process.

In operation 1008, the processor 120 may identify link flag information (for example, second link flag information) included in search-based recognition data of the second line. The processor 120 may identify (or extract) second search-based recognition data corresponding to the second line among the search-based recognition data included in the handwriting file. After performing operation 1008, the processor 120 may return to operation 1003 and determine whether an action link type (for example, a second action link type included in second link flag information) is configured.

When the action link type is configured, the processor 120 may identify and store search data in operation 1009. The processor 120 may identify first search data from the first search-based recognition data included in the first line and store the first search data in the search database. Operation 1009 may be the same as or similar to operation 1005.

In operation 1011, the processor 120 may collect stroke information on the basis of the stroke rectangle of the search data. The stroke information may include all strokes included in one line. Operation 1011 may be the same as or similar to operation 905 of FIG. 9.

In operation 1013, the processor 120 may circularly check strokes included in stroke information. Circularly checking the strokes may be identifying stroke IDs (for example, stroke identifiers) while circularly checking the strokes from the first stroke to the last stroke included in one line. For example, the processor 120 may identify the first stroke ID included in one line and perform operation 1015 in the first circular checking, and identify the second stroke ID included in one line and perform operation 1015 in the second circular checking. Operation 1013 may be the same as or similar to operation 907 of FIG. 9.

In operation 1015, the processor 120 may determine whether the stroke ID is larger than or equal to the first stroke ID (SH) and equal to or smaller than the last stroke ID (LH). The first stroke ID and the last stroke ID may be included in stroke order information. The processor 120 may determine whether the stroke ID corresponds to the stroke order information. The link flag information of the search-based recognition data may include stroke information, and the stroke information may include the total number of strokes (SC) and stroke order information (for example, the SH 335 and the LH 337 of FIG. 3). The processor 120 may identify (or configure) the first stroke ID (SH) and the last stroke ID (LH) on the basis of first stroke information included in the first link flag information corresponding to the first line.

When the line is changed, the processor 120 may identify the first stroke ID (SH) and the last stroke ID (LH) on the basis of stroke information included in the link flag information corresponding to the changed line. When the line is changed, the stroke order information is changed, and thus the processor 120 may determine whether the stroke ID corresponds to stroke order information of the changed line. For example, when the line is changed to a third line, the processor 120 may identify the first stroke ID (SH) and the last stroke ID (LH) on the basis of stroke information included in the third link flag information corresponding to the third line.

When the first stroke ID is larger than or equal to the first stroke ID (SH) and is not equal to or smaller than the last stroke ID (LH), the processor 120 may return to operation 1013 and circularly check the second stroke. When the second stroke ID is larger than or equal to the first stroke ID (SH) and is not equal to or smaller than the last stroke ID (LH), the processor 120 may return to operation 1013 and circularly check the third stroke. The processor 120 may repeatedly perform operation 1013 and operation 1015 until the stroke ID is larger than or equal to the first stroke ID (SH) and equal to smaller than the last stroke ID (LH). When the stroke ID is larger than or equal to the first stroke ID (SH) and equal to or smaller than the last stroke ID (LH), the processor 120 may perform operation 1017.

In operation 1017, the processor 120 may generate and store action link data. For example, when operation 1003 to operation 1015 are sequentially performed once, the processor 120 may generate and store first action link data. Thereafter, when operation 1003 to operation 1015 are sequentially performed twice, the processor 120 may generate and store second action link data. The generated action link data may be stored in an action link database.

After generating and storing action link data, the processor 120 may return to operation 1007 and determine whether the second line exists. When the second line exists, the processor 120 may return to operation 1008 and identify link flag information included in search-based recognition data corresponding to the second line (for example, the next line). When no second line exists in the handwriting file, the operation of identifying search data or the operation of generating action link file with respect to the handwriting file is not needed any more, and thus the processor 120 may end the process. The processor 120 may simultaneously identify search data and generate and store action link data with respect to all lines included in the handwriting file.

Figure 11:
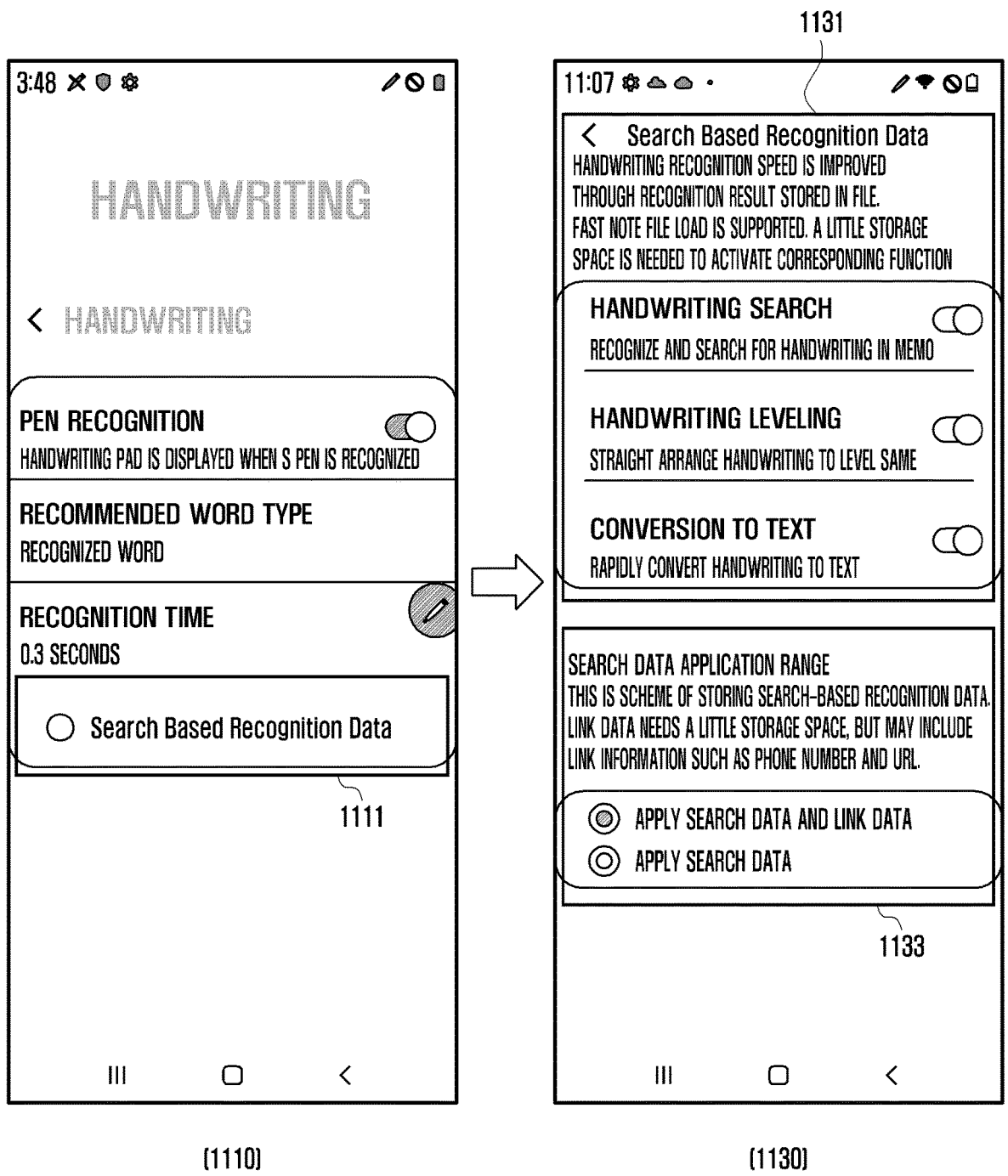
FIG. 11 illustrates an example in which the electronic device uses search-based recognition data according to various embodiments.

FIG. 11 illustrates an example in which the electronic device uses search-based recognition data according to according to one or more embodiments.

Referring to FIG. 11, a processor (for example, the processor 120 of FIG. 1) of an electronic device (for example, the electronic device 101 of FIG. 1) according to one or more embodiments may provide a first user interface 1110 for using search-based recognition data. When search-based recognition data 1111 is selected by the first user interface 1110, the processor 120 may provide a second user interface 1130. The second user interface 1130 may be for configuring an application range of the search-based recognition data. For example, the second user interface 1130 may include a first application range 1131 for using search-based recognition data for a related search of handwriting, leveling, and/or text conversion or a second application range 1133 for using the same for at least one of search data or action link data.

Figure 12:
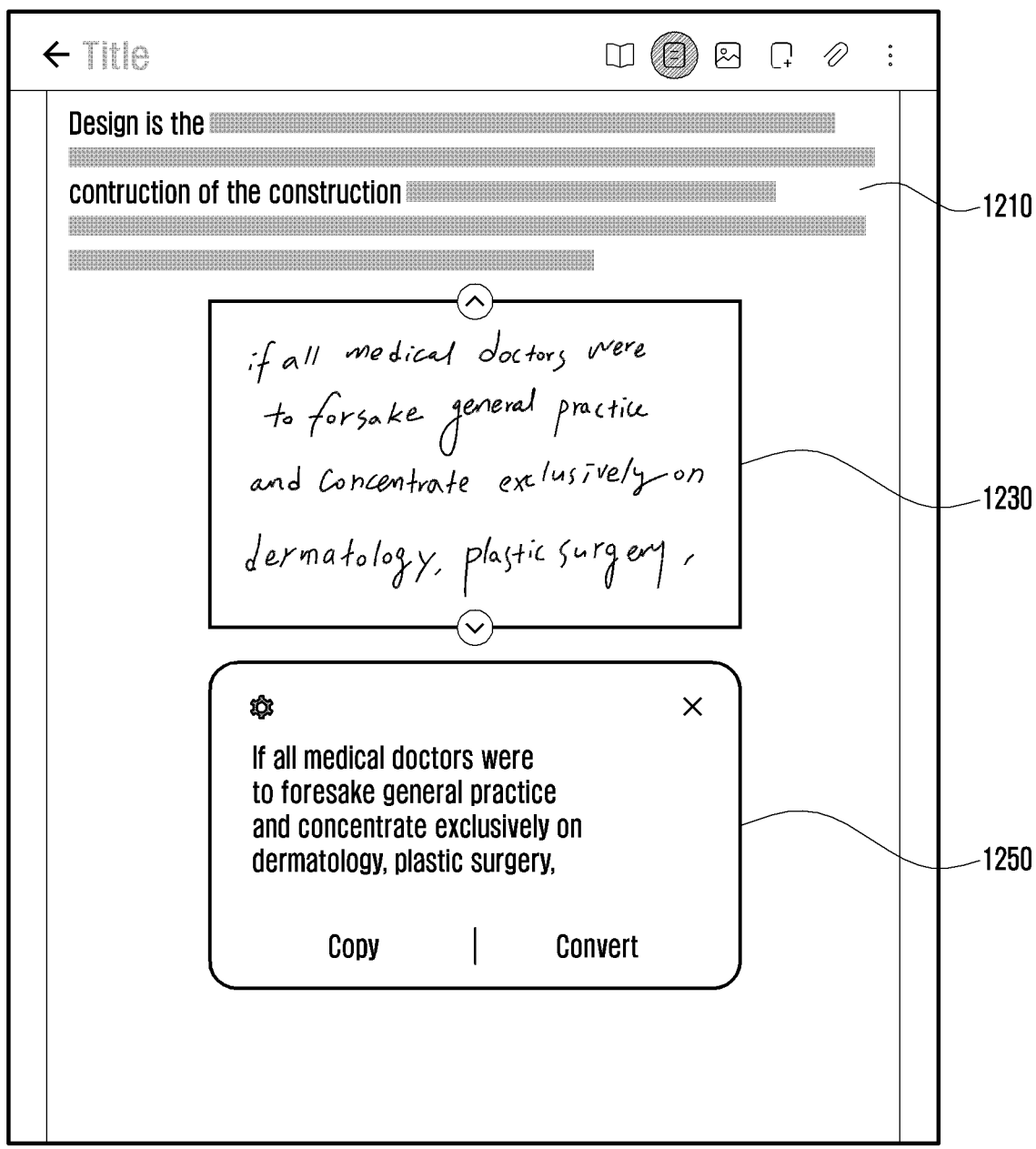
FIG. 12 illustrates an example in which the electronic device recognizes handwriting by using search-based recognition data according to various embodiments.

FIG. 12 illustrates an example in which the electronic device recognizes handwriting by using search-based recognition data according to one or more embodiments.

Referring to FIG. 12, a processor (for example, the processor 120 of FIG. 1) of an electronic device (for example, the electronic device 101 of FIG. 1) according to one or more embodiments may use search-based recognition data for a runtime recognition technology. For example, the processor 120 may generate text conversion data on the basis of search-based recognition data. The processor 120 may provide text conversion information 1250 from a handwriting file 1230 with reference to a keyword (for example, construction of the construction) included in a document file 1210.

Figure 13:
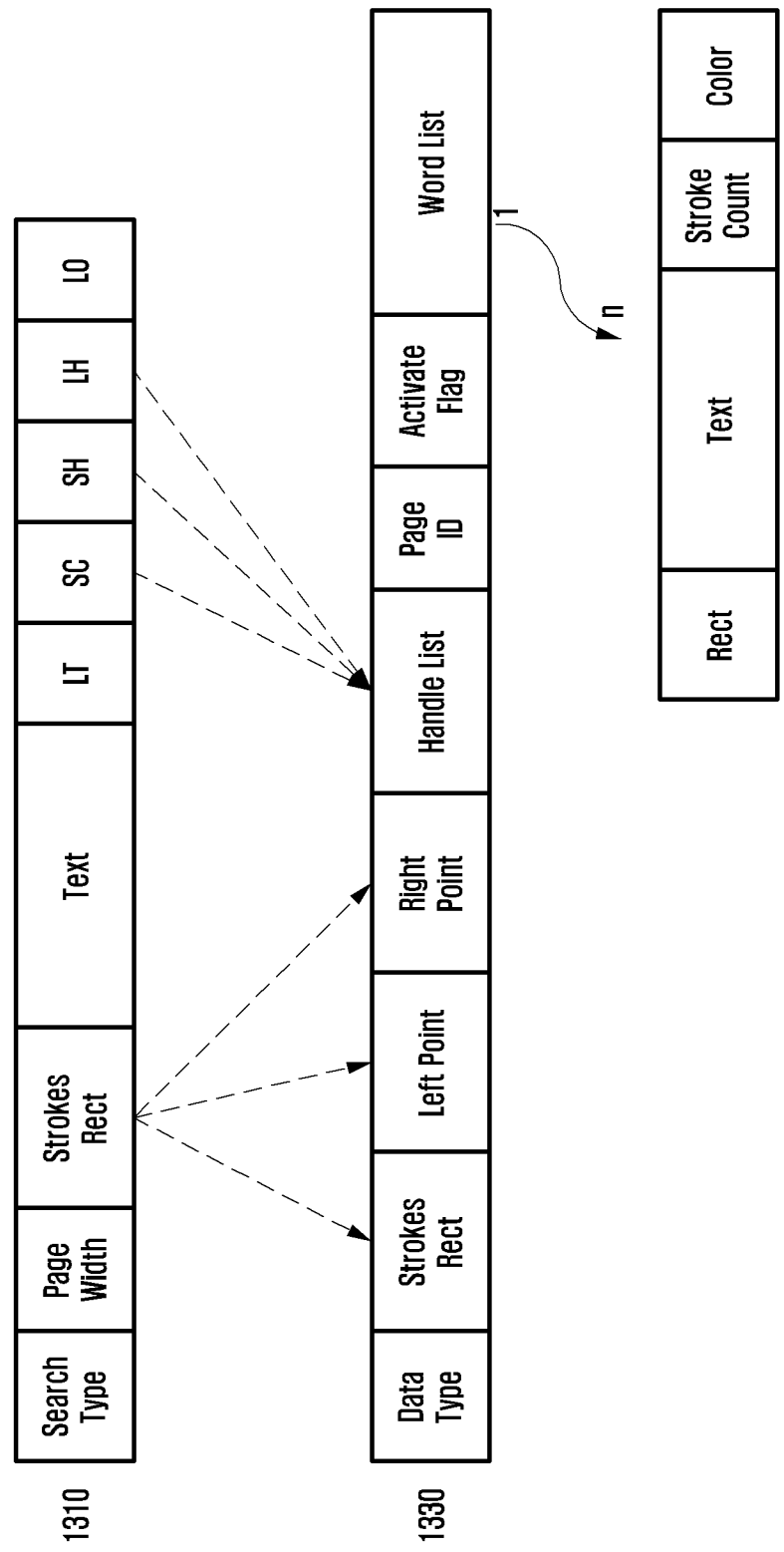
FIG. 13 illustrates an example in which the electronic device uses search-based recognition data according to various embodiments.

FIG. 13 illustrates an example in which the electronic device uses search-based recognition data according to various embodiments.

Referring to FIG. 13, a processor (for example, the processor 120 of FIG. 1) of an electronic device (for example, the electronic device 101 of FIG. 1) according to one or more embodiments may generate text conversion data 1330 on the basis of search-based recognition data 1310 For example, a stroke area (stroke rectangle) of the search-based recognition data 1310 may be included in a stroke area (stroke rectangle), a left point, and a right point of the text conversion data 1330 Further, since strokes should be changed to text in the text conversion data 1330, the processor 120 may insert some (SC, SH, LH, or LO) of the action link data of the search-based recognition data 1310 into a handle list (or a stroke list) of the text conversion data 1330.

The processor 120 may generate the number of words of the text conversion data 1330 on the basis of the number of spaces of text of the search-based recognition data 1310. After detecting the number of words, the processor 120 may analyze spatial information through the distance between strokes. In the case of N words, the processor 120 may analyze intervals between the widest N−1 strokes as spacing and detect strokes of the words on the basis of the analyzed spacing. A page ID may be an ID of a page located in the stroke area, and an active flag may be used for runtime. A word list may be analysis of spacing through calculation of the distance between handle lists and separation for each word. For example, the word list may include at least one of a union area, text, the number of strokes, and/or a color.

Figure 14:
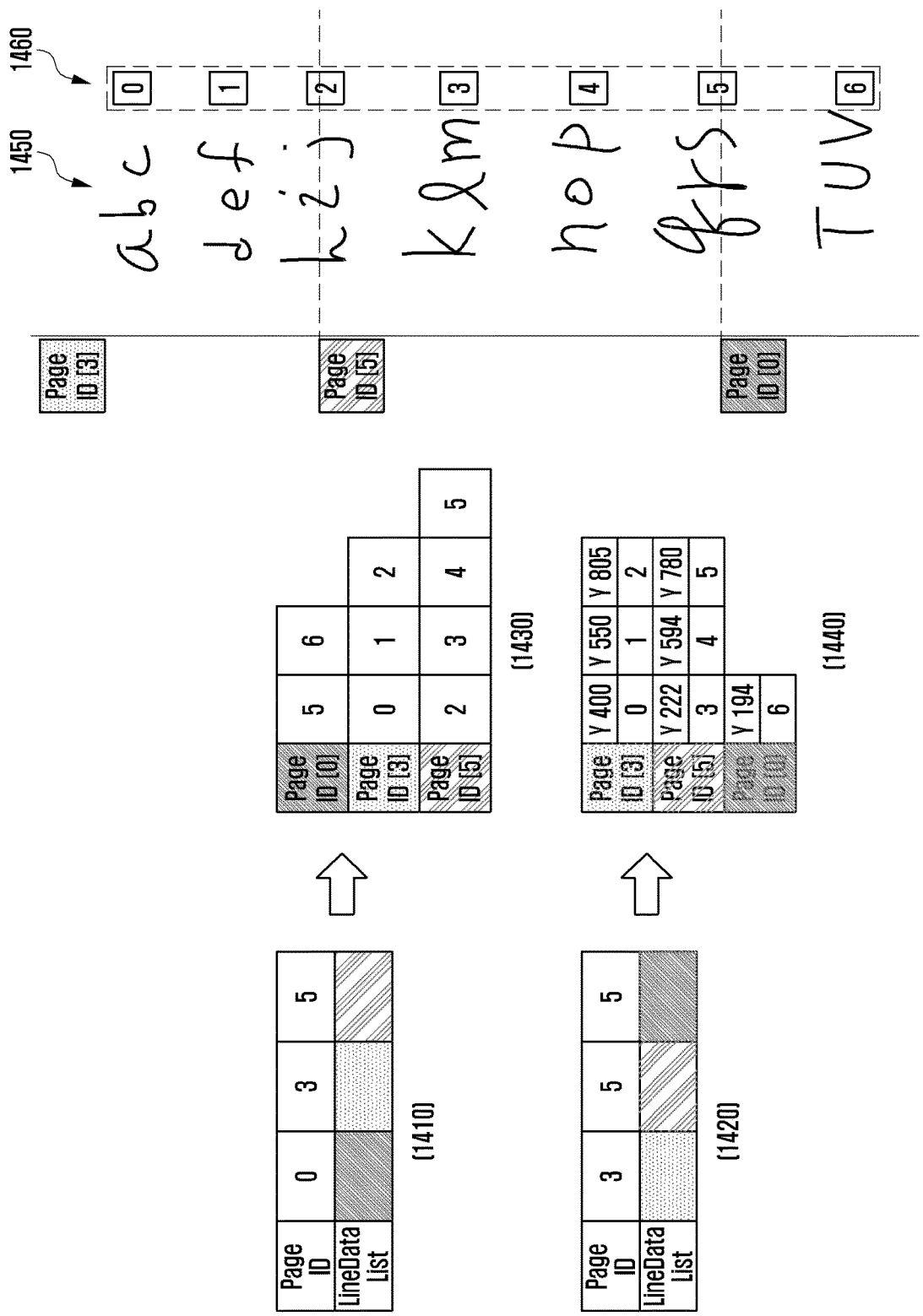
FIG. 14 illustrates another example in which the electronic device uses search-based recognition data according to various embodiments.

FIG. 14 illustrates another example in which the electronic device uses search-based recognition data according to various embodiments.

Referring to FIG. 14, a processor (for example, the processor 120 of FIG. 1) of an electronic device (for example, the electronic device 101 of FIG. 1) according to one or more embodiments may open a handwriting file 1450 to generate a hash table 1410 for each page and cache the form of the hash table 1410 in the memory. Indexes 1460 may be assigned to the handwriting file 1450 for respective real pages. Since large resource consumption is performed to recognize the hash table 1410, the processor 120 may reuse the hash table 1410 which has been generated once. The hash table 1410 may be all filled when the user makes a request for a recognition result with respect to all strokes of all pages several times. The processor 120 may generate a line map 1430 from the hash table 1410.

Search-based recognition data may have a stored layer which is very similar to spatial locality cache 1420 of text conversion data. The processor 120 may generate the hash table 1410 on the basis of stroke information (SC, SH, and LH) of action link data included in the search-based recognition data without recognition. When the hash table 1410 is modified, the processor 120 may change line data into which the modified area is inserted in a first spatial locality cache 1420. The processor 120 may generate a second spatial locality cache 1440 for displaying location information for each page in the first spatial locality cache 1420.

Figure 15A:
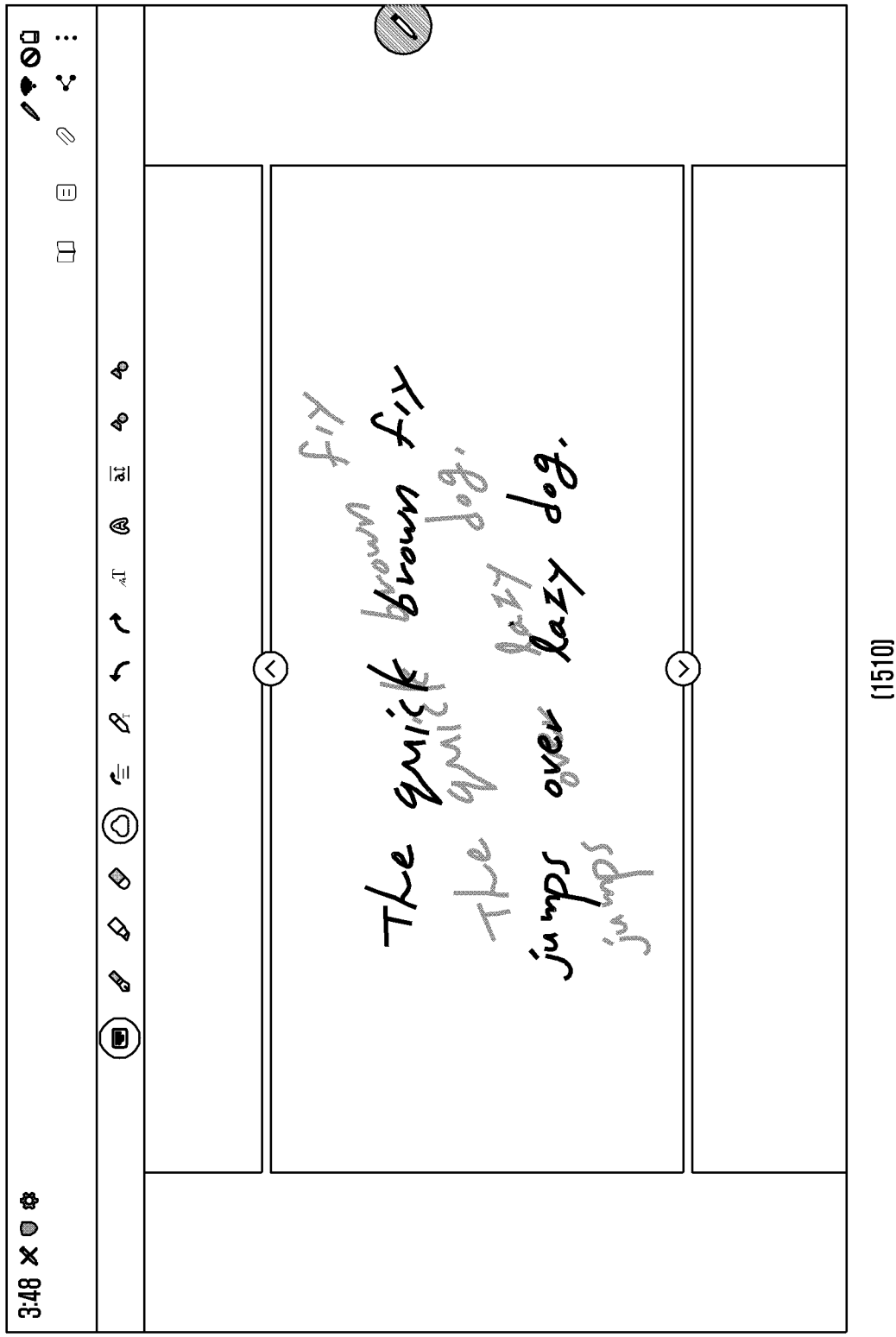

FIGS. 15A and 15B illustrate another example in which the electronic device uses search-based recognition data according to various embodiments.

Referring to FIG. 15A, a processor (for example, the processor 120 of FIG. 1) of an electronic device (for example, the electronic device 101 of FIG. 1) according to one or more embodiments may perform leveling of text on the basis of search-based recognition data. While only geometrical information is used and arranged without knowing the content of handwriting in screen 1510 in the state-of-the-art, non-characters are automatically classified if there is recognized text information, and thus the processor 120 may accurately arrange only strokes corresponding to text in accordance with one or more embodiments.

Referring to FIG. 15B, the processor 120 may arrange handwriting by applying an indentation according to a bullet (for example, numbers of bullets) before the text on the basis of search-based recognition data, for example, bullets 1531 and 1533.

A method of operating an electronic device (for example, the electronic device 101 of FIG. 1) according to one or more embodiments of the disclosure may include an operation of, as handwriting is input by a user, analyzing strokes of the input handwriting, an operation of generating search data and action link data, based on the analyzed strokes, an operation of generating search-based recognition data including the search data and link flag information associated with the action link data, and an operation of storing a handwriting file including the generated search-based recognition data.

The operation of generating the search data and the action link data may include an operation of determining lines of the handwriting, based on the analyzed strokes and an operation of generating the search data or the action link data for each of the determined lines.

The action link data may include at least one of an action link type, stroke information, or an index offset, and the operation of generating the action link data may include an operation of when an action link function corresponding to the input handwriting is provided, configuring the action link type, and an operation of, when an action link function corresponding to the input handwriting is not provided, not configuring the action link type.

The operation of configuring the action link type may include an operation of configuring the action link type as at least one of a phone number, an Internet address, an email address, or an equation.

The index offset may include an offset value for an index for which next action link data exists, and the operation of generating the action link data may include an operation of configuring an index offset of previous link flag information after determining an action link type of the next action link data.

The operation of generating the action link data may include an operation of determining an action link type and stroke information of the link flag information, based on the analyzed strokes, an operation of determining whether a next line exists in the handwriting, an operation of, when there is the next line in the handwriting, analyzing strokes of the next line, an operation of determining whether an action link exists in the next line, based on the analyzed strokes, and an operation of configuring an index offset of the link flag information when the action link exists in the next line and not configuring the index offset of the link flag information when the action link does not exist in the next line.

The method may further include an operation of acquiring a second handwriting file different from the handwriting file, an operation of extracting second search-based recognition data included in the second handwriting file, and an operation of identifying and storing second search data or generating and storing second action link data, based on the second search-based recognition data.

The operation of identifying and storing the second search data or generating and storing the second action link data may further include an operation of generating and storing second action link data after completing the identifying and storing of the second search data for each line.

The method may include an operation of determining whether an action link type of link flag information for one link is configured, based on the second search-based recognition data, an operation of, when the action link type is configured, collecting stroke information, based on a stroke rectangle of second search data, an operation of circularly checking strokes, based on the collected stroke information, and identifying stroke IDs, an operation of determining whether the stroke IDs correspond to stroke order information included in the second search-based recognition data, and an operation of repeatedly performing the circular checking of the strokes and the determining whether a number of circularly checked strokes corresponds to the stroke order information until the number of circularly checked strokes corresponds to the stroke order information.

Various embodiments of the disclosure disclosed in the specifications and drawings present specific examples for ease of description of the technical content of the disclosure and to help understanding of the disclosure, but are not intended to limit the scope of the disclosure. Therefore, it should be construed that not only the embodiments disclosed herein but also all modifications or modified forms capable of being derived on the basis of the technical idea of the disclosure are included in the scope of the disclosure.

What is claimed is:

1. An electronic device comprising:
a touch display;
memory storing instructions; and
a processor,
wherein the instructions stored in the memory are configured to, when executed by the processor, cause the electronic device to:
receive handwriting input on the touch display from a user;
analyze strokes of the handwriting;
determine lines of the handwriting, based on the analyzed strokes;
generate search data for including text information corresponding to the handwriting for each of the lines and action link data for executing a function corresponding to the handwriting for each of the lines, based on the analyzed strokes;

generate search-based recognition data, the search-based recognition data including the search data and link flag information for generating the action link data;

store a handwriting file including the generated search-based recognition data;

wherein the link flag information includes at least one of an action link type, stroke information, or an index offset; and configure another index offset of previous link flag information after determining an action link type of next action link data;

wherein the index offset includes an offset value for an index for which the next action link data exists:

wherein the search-based recognition data is included in the handwriting file and shared with an electronic device of a counterpart, the electronic device of the counterpart generates the action link data on a basis of the link flag information included in the search-based recognition data.

2. The electronic device of claim 1, wherein the instructions, when executed by the processor, cause the electronic device to:

in response to an action link function corresponding to the handwriting being provided, configure the action link type; and in response to the action link function corresponding to the handwriting not being provided, not configure the action link type.

3. The electronic device of claim 2, wherein the instructions, when executed by the processor, cause the electronic device to configure the action link type as at least one of a phone number, an Internet address, an email address, or an equation.

4. The electronic device of claim 2, wherein the stroke information includes at least one of a total number of strokes, a first stroke identification (ID), or a last stroke ID for one line.

5. The electronic device of claim 2, wherein the instructions that, when executed by the processor, cause the electronic device to:

determine an action link type and the stroke information of the link flag information, based on the analyzed strokes;

determine whether a next line exists in the handwriting;

in response to there being the next line in the handwriting, analyze other strokes of the next line;

determine whether an action link exists in the next line, based on the other strokes of the next line; and configure another index offset of the link flag information in response to the action link existing in the next line and not configure the another index offset of the link flag information in response to the action link not existing in the next line.

6. The electronic device of claim 1, wherein the instructions that, when executed by the processor, cause the electronic device to:

acquire a second handwriting file different from the handwriting file;

extract second search-based recognition data included in the second handwriting file; and identify and store second search data or generate and store second action link data, based on the second search-based recognition data.

7. The electronic device of claim 6, wherein the the instructions, when executed by the processor, cause the electronic device to perform an operation of generating and storing second action link data after completing the identifying and storing of the second search data for each line.

8. The electronic device of claim 7, wherein the instructions, when executed by the processor, cause the electronic device to:

determine whether an action link type of a second link flag information for one link is configured, based on the second search-based recognition data;

in response to the action link type being configured, collect stroke information, based on a stroke rectangle of the second search data;

circularly check other strokes, based on the stroke information and identify stroke identifications (IDs);

determine whether the stroke IDs correspond to stroke order information included in the second search-based recognition data; and repeatedly perform an operation of identifying the other strokes and an operation of determining whether the stroke IDs correspond to the stroke order information until the stroke IDs correspond to the stroke order information.

9. The electronic device of claim 8, wherein the instructions, when executed by the processor, cause the electronic device to:

in response to the stroke IDs corresponding to the stroke order information, generate second action link data;

determine whether an index offset of second link flag information included in the second search-based recognition data is configured;

in response to the index offset of the second link flag information being configured, move by a value configured in the index offset and collect the stroke information; and in response to the index offset of the second link flag information not being configured, end an action link data generation operation.

10. A method of operating an electronic device, the method comprising:

receiving handwriting input on a touch display of the electronic device from a user;

analyzing strokes of the handwriting;

determining lines of the handwriting, based on the analyzed strokes;

generating search data for including text information corresponding to the handwriting for each of the lines and action link data for executing a function corresponding to the handwriting for each of the lines, based on the analyzed strokes;

generating search-based recognition data, the search-based recognition data including the search data and link flag information for generating the action link data;

storing a handwriting file including the generated search-based recognition data;

wherein the link flag information includes at least one of an action link type, stroke information, or an index offset; and configuring another index offset of previous link flag information after determining an action link type of next action link data;

wherein the index offset includes an offset value for an index for which the next action link data exists;

wherein the search-based recognition data is included in the handwriting file and shared with an electronic device of a counterpart, the electronic device of the counterpart generates the action link data on a basis of the link flag information included in the search-based recognition data.

11. The method of claim 10, wherein the generating of the action link data comprises:
in response to an action link function corresponding to the handwriting being provided, configuring the action link type; and
in response to the action link function corresponding to the handwriting not being provided, not configuring the action link type.

12. The method of claim 11, wherein the configuring of the action link type comprises configuring the action link type as at least one of a phone number, an Internet address, an email address, or an equation.

13. The method of claim 11, wherein the generating of the action link data comprises:
determining an action link type and the stroke information of the link flag information, based on the analyzed strokes;
determining whether a next line exists in the handwriting;
in response to there being the next line in the handwriting, analyzing other strokes of the next line;
determining whether an action link exists in the next line, based on the other strokes of the next line; and
configuring another index offset of the link flag information in response to the action link existing in the next line and not configuring the another index offset of the link flag information in response to the action link not existing in the next line.

14. The method of claim 10, further comprising:
acquiring a second handwriting file different from the handwriting file;
extracting second search-based recognition data included in the second handwriting file; and
identifying and storing second search data or generating and storing second action link data, based on the second search-based recognition data.

15. The method of claim 14, wherein the identifying and storing of the second search data or the generating and storing of the second action link data further comprises generating and storing second action link data after completing the identifying and storing of the second search data for each line.

16. The method of claim 15, comprising:
determining whether an action link type of a second link flag information for one link is configured, based on the second search-based recognition data;
in response to the action link type being configured, collecting stroke information, based on a stroke rectangle of the second search data;
circularly checking other strokes, based on the stroke information and identifying stroke identifications (IDs);
determining whether the stroke IDs correspond to stroke order information included in the second search-based recognition data; and
repeatedly performing the checking of the other strokes and the determining whether a number of circularly checked strokes corresponds to the stroke order information until the number of circularly checked strokes corresponds to the stroke order information.

* * * * *